United States Patent
Napadensky

(10) Patent No.: US 9,744,720 B2
(45) Date of Patent: Aug. 29, 2017

(54) METHODS FOR THREE DIMENSIONAL MODEL PRINTING

(71) Applicant: STRATASYS LTD., Rehovot (IL)

(72) Inventor: Eduardo Napadensky, Netanya (IL)

(73) Assignee: STRATASYS LTD., Rehovot (IL)

( * ) Notice: Subject to any disclaimer, the term of this patent is extended or adjusted under 35 U.S.C. 154(b) by 80 days.

(21) Appl. No.: 14/595,240

(22) Filed: Jan. 13, 2015

(65) Prior Publication Data

US 2015/0123298 A1    May 7, 2015

Related U.S. Application Data

(60) Continuation of application No. 13/044,804, filed on Mar. 10, 2011, now Pat. No. 8,932,511, which is a
(Continued)

(51) Int. Cl.
| | |
|---|---|
| *B29C 70/88* | (2006.01) |
| *B29C 67/00* | (2017.01) |
| *B29C 41/48* | (2006.01) |
| *B29C 41/52* | (2006.01) |
| *B29C 67/24* | (2006.01) |

(Continued)

(52) U.S. Cl.
CPC .......... *B29C 67/0055* (2013.01); *B29C 41/48* (2013.01); *B29C 41/52* (2013.01); *B29C 67/0059* (2013.01); *B29C 67/0092* (2013.01); *B29C 67/24* (2013.01); *B29C 37/005* (2013.01); *B29K 2063/00* (2013.01);
(Continued)

(58) Field of Classification Search
CPC . B29C 41/02; B29C 67/0051; B29C 67/0055; B29C 67/0059; B29C 67/0081; B29C 67/0085; B29C 67/0088; B29C 67/0092; B29C 67/0096; B29C 70/88; B33Y 10/00; B33Y 70/00
USPC .......................... 264/104, 105, 113, 255, 308
See application file for complete search history.

(56) References Cited

U.S. PATENT DOCUMENTS

| | | |
|---|---|---|
| 3,533,905 A | 10/1970 | O'Meara, Jr. |
| 3,803,109 A | 4/1974 | Nemoto et al. |

(Continued)

FOREIGN PATENT DOCUMENTS

| | | |
|---|---|---|
| EP | 0 393672 | 10/1990 |
| EP | 0410412 | 1/1991 |

(Continued)

*Primary Examiner* — Leo B Tentoni
(74) *Attorney, Agent, or Firm* — Pearl Cohen Zedek Latzer Baratz LLP

(57) ABSTRACT

A method for the preparation of a composite material having a pre-designed structure and properties according to the intended use of said composite material is provided. The method includes generating data for dispensing two or more different interface materials having different properties into at least two different phases; selectively depositing said two or more different interface materials having different properties from two or more corresponding dispensers to form layers according to the data generated, each interface material being dispensed from a different dispenser to form at least two different phases of interface materials; and curing or solidifying the dispensed layers to obtain a composite material with pre-designed structure and properties.

9 Claims, 13 Drawing Sheets

Related U.S. Application Data continuation of application No. 11/905,515, filed on Oct. 2, 2007, now abandoned, which is a division of application No. 10/725,995, filed on Dec. 3, 2003, now Pat. No. 7,300,619, which is a continuation-in-part of application No. 10/424,732, filed on Apr. 29, 2003, now abandoned, which is a continuation-in-part of application No. 09/803,108, filed on Mar. 12, 2001, now Pat. No. 6,569,373.

(60) Provisional application No. 60/188,698, filed on Mar. 13, 2000, provisional application No. 60/195,321, filed on Apr. 10, 2000, provisional application No. 60/430,362, filed on Dec. 3, 2002.

(51) Int. Cl.
| | |
|---|---|
| B29C 37/00 | (2006.01) |
| B41M 3/16 | (2006.01) |
| B33Y 10/00 | (2015.01) |
| B33Y 70/00 | (2015.01) |
| B29K 63/00 | (2006.01) |
| B29L 9/00 | (2006.01) |

(52) U.S. Cl.
CPC ........... *B29L 2009/00* (2013.01); *B33Y 10/00* (2014.12); *B33Y 70/00* (2014.12); *B41M 3/16* (2013.01)

(56) References Cited

U.S. PATENT DOCUMENTS

| | | | |
|---|---|---|---|
| 3,804,736 | A | 4/1974 | Pasternack |
| 3,813,462 | A | 5/1974 | Roberts |
| 4,056,453 | A | 11/1977 | Barzynski et al. |
| 4,303,924 | A | 12/1981 | Young, Jr. |
| 4,575,330 | A | 3/1986 | Hull |
| 4,929,403 | A | 5/1990 | Audsley |
| 4,942,001 | A | 7/1990 | Murphy et al. |
| 4,942,060 | A | 7/1990 | Grossa |
| 5,002,854 | A | 3/1991 | Fan et al. |
| 5,041,161 | A | 8/1991 | Cooke et al. |
| 5,059,266 | A | 10/1991 | Yamane et al. |
| 5,076,947 | A | 12/1991 | Kaneoya et al. |
| 5,094,935 | A | 3/1992 | Vassiliou et al. |
| 5,128,235 | A | 7/1992 | Vassiliou et al. |
| 5,136,515 | A | 8/1992 | Helinski |
| 5,149,548 | A | 9/1992 | Yamane et al. |
| 5,192,559 | A | 3/1993 | Hull et al. |
| 5,198,159 | A | 3/1993 | Nakamura et al. |
| 5,204,055 | A | 4/1993 | Sachs et al. |
| 5,236,812 | A | 8/1993 | Vassiliou et al. |
| 5,256,717 | A | 10/1993 | Stauffer et al. |
| 5,270,368 | A | 12/1993 | Lent et al. |
| 5,287,435 | A | 2/1994 | Cohen et al. |
| 5,340,433 | A | 8/1994 | Crump |
| 5,348,693 | A | 9/1994 | Taylor et al. |
| 5,387,380 | A | 2/1995 | Cima et al. |
| 5,490,962 | A | 2/1996 | Cima et al. |
| 5,495,029 | A | 2/1996 | Steinmann et al. |
| 5,503,785 | A | 4/1996 | Crump et al. |
| 5,510,226 | A | 4/1996 | Lapin et al. |
| 5,534,368 | A | 7/1996 | Morris et al. |
| 5,549,697 | A | 8/1996 | Caldarise |
| 5,594,652 | A | 1/1997 | Penn et al. |
| 5,629,133 | A | 5/1997 | Wolf et al. |
| 5,658,334 | A | 8/1997 | Caldarise et al. |
| 5,663,212 | A | 9/1997 | Wakata et al. |
| 5,674,921 | A | 10/1997 | Regula et al. |
| 5,695,707 | A | 12/1997 | Almquist et al. |
| 5,695,708 | A | 12/1997 | Karp et al. |
| 5,705,316 | A | 1/1998 | Steinmann et al. |
| 5,707,554 | A | 1/1998 | Bennett et al. |
| 5,707,780 | A | 1/1998 | Lawton et al. |
| 5,717,599 | A | 2/1998 | Menhennett et al. |
| 5,784,279 | A | 7/1998 | Barlage, III et al. |
| 5,807,437 | A | 9/1998 | Sachs et al. |
| 5,833,914 | A | 11/1998 | Kawaguchi |
| 5,855,836 | A | 1/1999 | Leyden et al. |
| 5,889,084 | A | 3/1999 | Roth |
| 5,902,537 | A | 5/1999 | Almquist et al. |
| 5,932,625 | A | 8/1999 | Watanabe et al. |
| 5,939,011 | A | 8/1999 | White et al. |
| 5,943,235 | A | 8/1999 | Earl et al. |
| 5,985,204 | A | 11/1999 | Otsuka et al. |
| 6,030,199 | A | 2/2000 | Tseng |
| 6,096,796 | A | 8/2000 | Watanabe et al. |
| 6,117,612 | A | 9/2000 | Halloran et al. |
| 6,136,252 | A | 10/2000 | Bedal et al. |
| 6,136,497 | A | 10/2000 | Melisaris et al. |
| 6,165,406 | A | 12/2000 | Jang et al. |
| 6,193,923 | B1 | 2/2001 | Leyden et al. |
| 6,259,962 | B1 | 7/2001 | Gothait |
| 6,327,363 | B1 | 12/2001 | Henderson et al. |
| 6,347,257 | B1 | 2/2002 | Bedal et al. |
| 6,350,403 | B1 | 2/2002 | Melisaris et al. |
| 6,406,658 | B1 | 6/2002 | Manners et al. |
| 6,467,897 | B1 | 10/2002 | Wu et al. |
| 6,490,496 | B1 | 12/2002 | Dacey |
| 6,508,971 | B2 | 1/2003 | Leyden et al. |
| 6,520,084 | B1 | 2/2003 | Gelbart |
| 6,532,394 | B1 | 3/2003 | Earl et al. |
| 6,569,373 | B2 | 5/2003 | Napadensky |
| 6,635,412 | B2 | 10/2003 | Afromowitz |
| 6,658,314 | B1 | 12/2003 | Gothait |
| 6,682,688 | B1 | 1/2004 | Higashi et al. |
| 6,685,869 | B2 | 2/2004 | Yamamura et al. |
| 6,841,116 | B2 | 1/2005 | Schmidt |
| 6,863,859 | B2 | 3/2005 | Levy |
| 6,936,212 | B1 | 8/2005 | Crawford |
| 6,984,352 | B1 | 1/2006 | Akopyan |
| 7,183,335 | B2 | 2/2007 | Napadensky |
| 7,268,173 | B2 | 9/2007 | Graichen et al. |
| 7,329,379 | B2 | 2/2008 | Boyd et al. |
| 7,393,880 | B2 | 7/2008 | Richard et al. |
| 7,479,510 | B2 | 1/2009 | Napadensky et al. |
| 7,851,122 | B2 | 12/2010 | Napadensky |
| 2002/0008333 | A1 | 1/2002 | Napadensky et al. |
| 2002/0008335 | A1 | 1/2002 | Leyden et al. |
| 2002/0011693 | A1 | 1/2002 | Leyden et al. |
| 2002/0016386 | A1 | 2/2002 | Napadensky |
| 2002/0167101 | A1 | 11/2002 | Tochimoto et al. |
| 2003/0082487 | A1 | 5/2003 | Burgess |
| 2003/0114936 | A1 | 6/2003 | Sherwood et al. |
| 2003/0207959 | A1 | 11/2003 | Napadensky et al. |
| 2004/0156478 | A1 | 8/2004 | Appleby et al. |
| 2004/0187714 | A1 | 9/2004 | Napadensky et al. |
| 2005/0023710 | A1 | 2/2005 | Brodkin et al. |
| 2005/0069784 | A1 | 3/2005 | Gothait et al. |
| 2005/0165648 | A1 | 7/2005 | Razumov |
| 2006/0208388 | A1* | 9/2006 | Bredt .................. B29C 67/0081 264/123 |
| 2015/0129798 | A1 | 5/2015 | Napadensky |

FOREIGN PATENT DOCUMENTS

| | | |
|---|---|---|
| EP | 0426363 | 5/1991 |
| EP | 0590957 | 4/1994 |
| EP | 0646580 | 4/1995 |
| EP | 0655317 | 5/1995 |
| EP | 0666163 | 8/1995 |
| EP | 0 737 585 | 1/1999 |
| EP | 0 852 536 | 9/2002 |
| JP | 63 102936 | 5/1988 |
| WO | WO 89/10801 | 11/1989 |
| WO | WO 92/00820 | 1/1992 |
| WO | WO 95/05935 | 3/1995 |
| WO | WO 95/05943 | 3/1995 |
| WO | WO 95/12485 | 5/1995 |
| WO | WO 97/11837 | 4/1997 |
| WO | WO 97/31781 | 9/1997 |
| WO | WO 98/09798 | 3/1998 |
| WO | WO 91/12120 | 8/1999 |

(56) References Cited

FOREIGN PATENT DOCUMENTS

| WO | WO 00/62994 | 10/2000 |
| WO | WO 01/26023 | 4/2001 |
| WO | WO 01/68375 | 9/2001 |
| WO | WO 00/11092 | 3/2002 |
| WO | WO 03/028985 | 9/2002 |
| WO | WO 2004/082252 | 9/2004 |

* cited by examiner

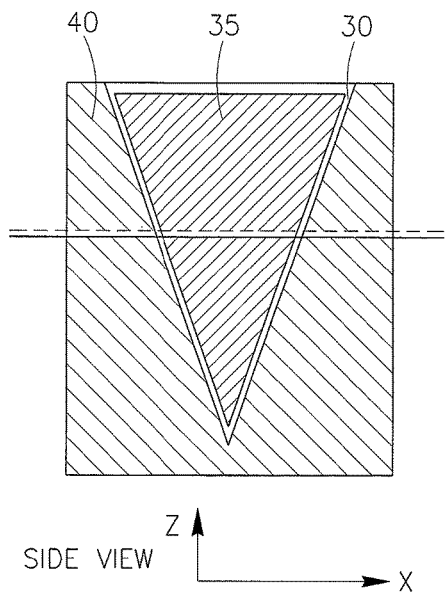
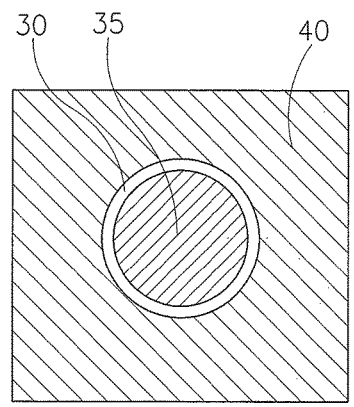
FIG.5C  FIG.5D
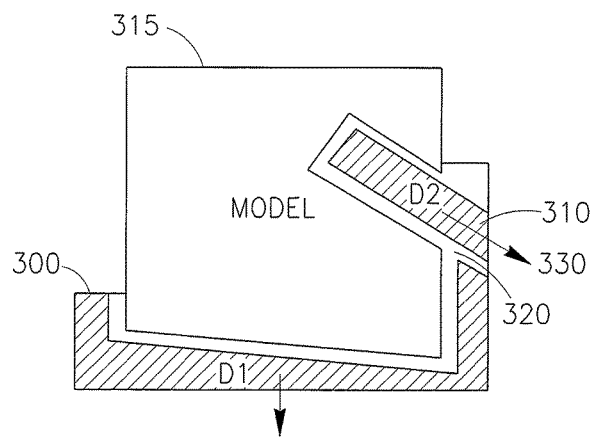
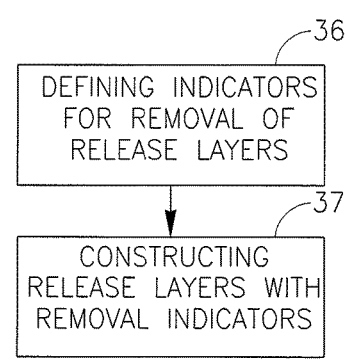
FIG.5E  FIG.5F

A

B

METHODS FOR THREE DIMENSIONAL MODEL PRINTING

CROSS REFERENCE TO RELATED APPLICATIONS

This application is a Continuation application of U.S. application Ser. No. 13/044,804 filed Mar. 10, 2011, now U.S. Pat. No. 8,932,511, which is a Continuation application of U.S. application Ser. No. 11/905,515 filed Oct. 2, 2007, now abandoned, which in turn is a Divisional application of U.S. application Ser. No. 10/725,995 filed Dec. 3, 2003, now U.S. Pat. No. 7,300,619 which in turn is a Continuation-In-Part application of U.S. application Ser. No. 10/424,732, filed Apr. 29, 2003, now abandoned, which in turn is a Continuation-In-Part application of U.S. application Ser. No. 09/803,108, filed 12 Mar. 2001, now U.S. Pat. No. 6,569,373, which claims priority of provisional application 60/188,698, filed 13 Mar. 2000, and provisional application 60/195,321 filed 10 Apr. 2000, each of which are incorporated in its entirety by reference herein. U.S. application Ser. No. 10/725,995 also claims priority of provisional application 60/430,362, filed 3 Dec. 2002 and incorporated by reference herein in its entirety.

FIELD OF THE INVENTION

The present invention relates to three-dimensional object building in general and to methods and compositions for use in three-dimensional printing of complex structures in particular.

BACKGROUND OF THE INVENTION

Three-dimensional printing, which typically works by building parts in layers, is a process used for the building up of three-dimensional objects. Three-dimensional printing is relatively speedy and flexible, allowing for the production of prototype parts, tooling and rapid manufacturing of three-dimensional complex structures directly from a CAD file, for example.

Using three-dimensional printing may enable a manufacturer to obtain a full three-dimensional model of any proposed product before tooling, thereby possibly substantially reducing the cost of tooling and leading to a better synchronization between design and manufacturing. A lower product cost and improved product quality may also be obtained.

Using three-dimensional printing also enables the direct manufacturing of full three-dimensional objects, thereby substantially reducing costs and leading to a better synchronization between design, production and consumption (use). A lower product cost and improved product quality may thus also be obtained.

Various systems have been developed for computerized three-dimensional printing. In U.S. Pat. No. 6,259,962 to the Assignees of the present application, and incorporated herein by reference, embodiments of an apparatus and a method for three-dimensional model printing are described. The apparatus according to some embodiments in this patent include a printing head having a plurality of nozzles, a dispenser connected to the printing head for selectively dispensing interface material in layers, and curing means for optionally curing each of the layers deposited. The depth of each deposited layer may be controllable by selectively adjusting the output from each of the plurality of nozzles.

In U.S. patent application Ser. No. 09/412,618 to the Assignees of the present invention, and incorporated herein by reference, embodiments are described including an apparatus and a method for three-dimensional model printing. Some embodiments of this application describe a system and a method for printing complex three-dimensional models by using interface materials having different hardness or elasticity and mixing the interface material from each of the printing heads to control the hardness of the material forming the three-dimensional model. The construction layers of the model may be formed from interface material having a different (harder) modulus of elasticity than the material used to form the release (and support) layers, thereby allowing for the forming of complex shapes.

Radiation curable inks are disclosed in, for example, U.S. Pat. Nos. 4,303,924, 5,889,084, and 5,270,368. U.S. Pat. No. 4,303,924 discloses, inter alia, radiation curable compositions for jet-drop printing containing multifunctional ethylenically unsaturated material, monofunctional ethylenically unsaturated material, a reactive synergist, a dye colorant and an oil soluble salt. U.S. Pat. No. 5,889,084 discloses, inter alia, a radiation curable ink composition for ink-jet printing which includes a canonically photoreactive epoxy or vinyl ether monomer or oligomer, a cationic photo-initiator and a coloring agent. U.S. Pat. No. 5,270,368 discloses, inter alia, a UV curable ink composition for ink-jet printing including a resin formulation having at least two acrylate components, a photo-initiator and an organic carrier.

The ink compositions disclosed in these references are typically formulated for use in ink-jet printing. Compositions for ink-jet printing are typically formulated differently from compositions for building three-dimensional objects, and thus have different properties. For example, high viscosity at room temperature is a desirable property for three-dimensional objects, and thus compositions for building three-dimensional objects are typically designed to have a high viscosity at room temperature. In contrast, compositions for ink-jet printing are designed to have low viscosity at room temperature in order to function well in the printing process. None of the above-mentioned references disclose compositions that are especially formulated for three-dimensional printing.

Radiation curable compositions for stereolithography are disclosed in U.S. Pat. No. 5,705,316. U.S. Pat. No. 5,705,316 discloses compounds having at least one vinyl ether group, which also contain in the molecule at least one other functional group such as an epoxy or an acrylate group; compositions including these compounds; and methods of producing three-dimensional objects using these compositions. The compounds of U.S. Pat. No. 5,705,316 are complex molecules that are not readily available and thus need to be especially synthesized, which incurs additional time and costs.

Thus, there is a need for simple, easily obtainable curable compositions, that are specially formulated to construct a three-dimensional object. There is further a need for simple, easily obtainable curable compositions, that are specially formulated to provide support to a three-dimensional object, by forming support/and or release layers around the object during its construction. Lastly, there is a need for methods of constructing a three-dimensional object having improved qualities.

SUMMARY OF THE INVENTION

Embodiments of the present invention relates to compositions for use in the manufacture of three-dimensional objects. Embodiments of the present invention further relates to compositions for use as a support and/or release material in the manufacture of the three-dimensional objects. Embodiments of the present invention further relates to a method for the preparation of a three-dimensional object by three-dimensional printing, and to a three-dimensional object obtained by the method.

There is thus provided, in accordance with an embodiment of the present invention, a composition for use in the manufacture of three-dimensional objects by a method of selective dispensing. The composition may include, inter alia, at least one reactive component, at least one photo-initiator, at least one surface-active agent, and at least one stabilizer.

The composition has a first viscosity above 50 cps at room temperature, and a second viscosity compatible with ink-jet printers at a second temperature, wherein the second temperature is higher than room temperature.

In accordance with an embodiment of the present invention, the reactive component is an acrylic component, a molecule having one or more epoxy substituents, a molecule having one or more vinyl ether substituents, vinylcaprolactam, vinylpyrolidone, or any combination thereof.

Furthermore, in accordance with an embodiment of the present invention, the reactive component is an acrylic component. The acrylic component is an acrylic monomer, an acrylic oligomer, an acrylic crosslinker, or any combination thereof.

Furthermore, in accordance with an embodiment of the present invention, the reactive component may include, inter alia, an acrylic component and in addition a molecule having one or more epoxy substitutents, a molecule having one or more vinyl ether substituents, vinylcaprolactam, vinylpyrolidone, or any combination thereof.

Furthermore, in accordance with an embodiment of the present invention, the reactive component may include, inter alia, an acrylic component and vinylcaprolactam.

Furthermore, in accordance with an embodiment of the present invention, the reactive component may include, inter alia, a molecule having one or more vinyl ether substitutents.

Furthermore, in accordance with an embodiment of the present invention, the reactive component may include, inter alia, a molecule having one or more epoxy substituents.

Furthermore, in accordance with an embodiment of the present invention, the reactive component may include, inter alia, a molecule having one or more vinyl ether substituents, and a molecule having one or more epoxy substituents.

Furthermore, in accordance with an embodiment of the present invention, the photo-initiator is a free radical photo-initiator, a cationic photo-initiator, or any combination thereof.

Furthermore, in accordance with an embodiment of the present invention, the composition further includes at least one pigment and at least one dispersant. The pigment is a white pigment, an organic pigment, an inorganic pigment, a metal pigment or a combination thereof. In one embodiment, the composition further includes a dye.

Furthermore, in accordance with an embodiment of the present invention, the first viscosity of the composition is greater than 80 cps. In one embodiment, the first viscosity is between 80 and 300 cps. In another embodiment, the first viscosity is around 300 cps.

Furthermore, in accordance with an embodiment of the present invention, the second viscosity of the composition is lower than 20 cps at a second temperature, which is greater than 60° C. Preferably, the second viscosity is between 8 and 15 cps at the second temperature, which is greater than 60° C. In one embodiment, the second viscosity is about 11 cps at a temperature around 85° C.

In addition, in accordance with another embodiment of the present invention, there is thus provided a composition for use as a support and/or release material in the manufacture of three-dimensional objects by a method of selective dispensing. The composition may include, inter alia, at least one non-reactive and low toxicity compound, at least one surface-active agent and at least one stabilizer.

The composition has a first viscosity above 50 cps at room temperature, and a second viscosity compatible with ink-jet printers at a second temperature, wherein the second temperature is higher than room temperature.

In accordance with an embodiment of the present invention, the composition may further include, inter alia, at least one reactive component and at least one photo-initiator. The reactive component is at least one of an acrylic component, a molecule having one or more vinyl ether substituents, or the reactive component is a water miscible component that is, after curing, capable of swelling upon exposure to water or to an alkaline or acidic water solution.

Furthermore, in accordance with an embodiment of the present invention the reactive component is an acrylic component. The acrylic component is an acrylic oligomer, an acrylic monomer, or a combination thereof.

Furthermore, in accordance with an embodiment of the present invention, the reactive component may include, inter alia, at least one water miscible component that is, after curing, capable of swelling upon exposure to water or to an alkaline or acidic water solution. The water miscible component is preferably an acrylated urethane oligomer derivative of polyethylene glycol, a partially acrylated polyol oligomer, an acrylated oligomer having hydrophilic substituents, or any combination thereof. The hydrophilic substituents are preferably acidic substituents, amino substituents, hydroxy substituents, or any combination thereof.

Furthermore, in accordance with an embodiment of the present invention, the reactive component may include, inter alia, a molecule having one or more vinyl ether substituents.

Furthermore, in accordance with an embodiment of the present invention, the non-reactive component is polyethylene glycol, methoxy polyethylene glycol, glycerol, ethoxylated polyol, or propylene glycol.

Furthermore, in accordance with an embodiment of the present invention, the photo-initiator is a free radical photo-initiator, a cationic photo-initiator, or a combination thereof.

Furthermore, in accordance with an embodiment of the present invention, the first viscosity of the composition is greater than 80 cps. In one embodiment, the first viscosity is between 80 and 300 cps. In another embodiment, the first viscosity is around 200 cps.

Furthermore, in accordance with an embodiment of the present invention, the second viscosity of the composition is lower than 20 cps at a second temperature, which is greater than 60° C. Preferably, the second viscosity is between 8 and 15 cps at the second temperature, which is greater than 60° C. In one embodiment, the second viscosity is about 11 cps at a temperature around 85° C.

In addition, there is thus provided, in accordance with an embodiment of the present invention, a method for preparation of a three-dimensional object by three-dimensional printing. The method according to an embodiment includes:

dispensing a first interface material from a printing head, the first interface material may include, inter alia, at least one reactive component, at least one photo-initiator, at least one surface-active agent and at least one stabilizer, dispensing a second interface material from the printing head, the second interface material may include, inter alia, at least one non-reactive and low toxicity compound, at least one surface-active agent, and at least one stabilizer, combining the first interface material and the second interface material in pre-determined proportions to produce construction layers for forming the three-dimensional object.

Furthermore, in accordance with an embodiment of the present invention, the reactive component of the first interface material is an acrylic component, a molecule having one or more epoxy substituents, a molecule having one or more vinyl ether substituents, vinylpyrolidone, vinylcaprolactam, or any combination thereof.

Furthermore, in accordance with an embodiment of the present invention, the reactive component of the first interface material may include, inter alia, an acrylic component. The acrylic component is an acrylic monomer, an acrylic oligomer, an acrylic crosslinker, or any combination thereof.

Furthermore, in accordance with an embodiment of the present invention, the reactive component of the first interface material may include, inter alia, an acrylic component and in addition a molecule having one or more epoxy substituents, a molecule having one or more vinyl ether substituents, vinylcaprolactam, vinylpyrolidone, or any combination thereof.

Furthermore, in accordance with an embodiment of the present invention, the reactive component of the first interface material may include, inter alia, an acrylic component and vinylcaprolactam.

Furthermore, in accordance with an embodiment of the present invention, the reactive component of the first interface material is a molecule having one or more vinyl ether substituents.

Furthermore, in accordance with an embodiment of the present invention, the reactive component of the first interface material is a molecule having one or more epoxy substituents.

Furthermore, in accordance with an embodiment of the present invention, the reactive component of the first interface material may include, inter alia, a molecule having one or more epoxy substituents, and a molecule having one or more vinyl ether substituents.

Furthermore, in accordance with an embodiment of the present invention, the first interface material may further include, inter alia, at least one pigment and at least one dispersant. The pigment is a white pigment, an organic pigment, an inorganic pigment, a metal pigment or a combination thereof. In one embodiment, the first interface material may further include, inter alia, a dye.

Furthermore, in accordance with an embodiment of the present invention, the method may further include the step of curing the first interface material.

Furthermore, in accordance with an embodiment of the present invention, the second interface material further may include, inter alia, at least one reactive component and at least one photo-initiator. The reactive component is at least one of an acrylic component, a molecule having one or more vinyl ether substituents, or the reactive component is a water miscible component that is, after curing, capable of swelling upon exposure to water or to an alkaline or acidic water solution.

Furthermore, in accordance with an embodiment of the present invention the reactive component is an acrylic component. The acrylic component is an acrylic oligomer, an acrylic monomer, or a combination thereof.

Furthermore, in accordance with an embodiment of the present invention, the reactive component may include, inter alia, at least one water miscible component that is, after curing, capable of swelling upon exposure to water or to an alkaline or acidic water solution. The water miscible component is preferably an acrylated urethane oligomer derivative of polyethylene glycol, a partially acrylated polyol oligomer, an acrylated oligomer having hydrophillic substituents, or any combination thereof. The hydrophilic substituents are preferably acidic substituents, amino substituents, hydroxy substituents, or any combination thereof.

Furthermore, in accordance with an embodiment of the present invention, the reactive component of the second interface material may include, inter alia, a molecule having one or more vinyl ether substituents.

Furthermore, in accordance with an embodiment of the present invention, the non-reactive component is polyethylene glycol, methoxy polyethylene glycol, glycerol, ethoxylated polyol, or propylene glycol.

Furthermore, in accordance with an embodiment of the present invention, the photo-initiator of the first interface material and optionally of the second interface material is a free radical photo-initiator, a cationic photo-initiator or any combination thereof.

Furthermore, in accordance with an embodiment of the present invention, the method may further include the step of irradiating or curing the second interface material.

Furthermore, in accordance with an embodiment of the present invention, the first interface material and the second interface material have a different modulus of elasticity and a different strength. In one embodiment, the first interface material has a higher modulus of elasticity and a higher strength than the second interface material.

Furthermore, in accordance with an embodiment of the present invention, the method may further include the step of forming a multiplicity of support layers for supporting the object. In one embodiment, the support layers are formed by combining the first interface material and the second interface material in pre-determined proportions. In one embodiment, the support layers have the same modulus of elasticity and the same strength as the construction layers. In another embodiment, the support layers have a lower modulus of elasticity and a lower strength than the construction layers.

Furthermore, in accordance with an embodiment of the present invention, the method may further include the step of combining the first interface material and the second interface material in pre-determined proportions to form a multiplicity of release layers for releasing the support layers from the object. In one embodiment, the release layers have a lower modulus of elasticity and a lower strength than the construction layers and the support layers.

Furthermore, in accordance with an embodiment of the present invention, the first interface material and the second interface material each have a first viscosity at room temperature, and a second viscosity compatible with ink-jet printers at a second temperature, which may be the same or different, wherein the second temperature is higher than room temperature.

In addition, there is thus provided, in accordance with another embodiment of the present invention, a three-dimensional object comprised of a core consisting of a multiplicity of construction layers. The construction layers are prepared by combining pre-determined proportions of the first interface material and the second interface material, described herein.

Furthermore, in accordance with an embodiment of the present invention, the object may further include a multiplicity of support layers for supporting the core. In one embodiment, the support layers are prepared by combining pre-determined proportions of the first interface material and a second interface material. In one embodiment, the support layers have the same modulus of elasticity and the same strength as the construction layers. In another embodiment, the support layers have a lower modulus of elasticity and a lower strength than the construction layers.

Furthermore, in accordance with a preferred embodiment of the present invention, the object may further include a multiplicity of release layers for releasing the support layers from the core. In one embodiment, the release layers are positioned between the support layers and the construction layers. The release layers are prepared by combining pre-determined proportions of the first interface material and a second interface material. In one embodiment, the release layers have a lower modulus of elasticity and a lower strength than the construction layers and the support layers.

One embodiment of the present invention provides a composition suitable for building a three-dimensional object, the composition may include, inter alia, a curable component, having a functional group, wherein if the functional group is a polymerizable reactive functional group, then the functional group is a (meth)acrylic functional group, a photo-initiator, a surface-active agent and a stabilizer, wherein the composition has a first viscosity of about 50-500 cps at a first temperature, wherein the first temperature is ambient temperature, and a second viscosity lower than 20 cps at a second temperature wherein the second temperature is higher than the first temperature, wherein, after curing, the composition results in a solid form.

One embodiment of the present invention provides a composition suitable for support in building a three-dimensional object, the composition may include, inter alia, a non-curable component, a curable component, wherein the non-curable component is not reactive with the curable component, a surface-active agent and a stabilizer, wherein the composition has a first viscosity of about 20-500 cps at a first temperature, wherein the first temperature is ambient temperature, and a second viscosity lower than 20 cps at a second temperature wherein the second temperature is higher than the first temperature, wherein, after irradiation, the composition results in a solid, a semi solid or a liquid material.

One embodiment of the present invention provides a composition suitable for support in building a three-dimensional object, the composition may include, inter alia, a non-curable component, a curable (meth)acrylic component, wherein the non-curable component is not reactive with the curable component, a surface-active agent, a free radical photo-initiator and a stabilizer, wherein the composition has a first viscosity of about 20-500 cps at a first temperature, wherein the first temperature is ambient temperature, and a second viscosity lower than 20 cps at a second temperature wherein the second temperature is higher than the first temperature, wherein, after irradiation, the composition results in a solid, a semi solid or a liquid material.

One embodiment of the present invention further provides a composition suitable for support in building a three-dimensional object, the composition may include, inter alia, at least one non-curable component, at least one curable component including a molecule having one or more epoxy substituents, wherein the non-curable component is not reactive with the curable component, at least one surface-active agent, at least one cationic photo-initiator and at least one stabilizer, wherein the composition has a first viscosity of about 20-500 cps at a first temperature, wherein the first temperature is ambient temperature, and a second viscosity lower than 20 cps at a second temperature wherein the second temperature is higher than the first temperature, wherein, after irradiation, the composition results in a solid, a semi solid or a liquid material.

One embodiment of the present invention further provides a method for the preparation of a three-dimensional object by three-dimensional printing, the method may include the steps of dispensing a first composition suitable for building a three-dimensional object from a dispenser, the first composition may include a curable component, having a functional group, wherein if the functional group is a polymerizable reactive functional group, then the functional group is a (meth)acrylic functional group, a photo-initiator, a surface-active agent, and a stabilizer, dispensing a second composition suitable for support in building a three-dimensional object from a dispenser, the second composition may include a non-curable component, a curable component, wherein the non-curable component is not reactive with the curable component, a surface-active agent and a stabilizer, combining the first composition and the second composition in pre-determined proportions to produce a multiplicity of construction layers for forming the three-dimensional object, whereby the first composition is cured resulting in a solid form, and whereby the second composition is irradiated or cured resulting in a liquid, a solid or a semi-solid form.

One embodiment of the present invention further provides a three-dimensional object comprised of a multiplicity of construction layers, wherein the construction layers are prepared by combining pre-determined proportions of a first composition and a second composition according to the invention.

Compositions for use in the manufacture of three-dimensional objects including compositions for use as a support and/or release material in the manufacture of the three-dimensional objects are provided. There is thus provided, in accordance with an embodiment of the present invention, a composition suitable for building a three-dimensional object. The compositions may include, inter alia, a curable component, having a functional group, wherein if the functional group is a polymerizable reactive functional group, then the functional group is a (meth)acrylic functional group, a photo-initiator, a surface-active agent and a stabilizer; wherein said composition has a first viscosity of about 50-500 cps at a first temperature, wherein said first temperature is ambient temperature, and a second viscosity lower than 20 cps at a second temperature wherein said second temperature is higher than said first temperature, wherein, after curing, the composition results in a solid form. There is thus provided, in accordance with another embodiment of the present invention, a composition suitable for support in building a three-dimensional object. The compositions may include, inter alia: a non-curable component, a curable component, wherein the non-curable component is not reactive with said curable component, a surface-active agent and a stabilizer, wherein said composition has a first viscosity of about 20-500 cps at a first temperature, wherein said first temperature is ambient temperature, and a second viscosity lower than 20 cps at a second temperature wherein said second temperature is higher than said first temperature, wherein, after irradiation, the composition results in a solid, a semi-solid or liquid material. A method for the preparation of a three-dimensional object by three-dimensional printing is provided in accordance with embodiments of the present invention. Embodiments of the present invention further provide a three-dimensional object prepared according to the methods of the invention.

One embodiment of the present invention further provides a method for printing a three-dimensional object, the method may include, inter alia, depositing a first portion of a layer of interface material, by a three-dimensional printing apparatus, and depositing an additional portion of the layer of interface material, the additional portion separated by the first portion by a space, wherein the first portion, the additional portion, and the space are disposed within the same plane. In another embodiment, the method may include, inter alia, forming one or more non-continuous segments within the layer of interface material. In another embodiment, the method may include, inter alia, filling the space. In another embodiment, the method may include, inter alia, depositing the portions in selected areas. In another embodiment, the method may include, inter alia, depositing an additional layer in an additional plane, the additional layer including an additional space, the space and the additional space being displaced when viewed perpendicular to the additional plane.

One embodiment of the present invention further provides a method for printing a three-dimensional object, the method may include, inter alia, depositing a support construction and depositing a rigid exterior around the support construction, and depositing a release layer around the rigid construction, the release layer being between the rigid exterior and the object. In another embodiment, the rigid exterior may have a substantially similar strength and elasticity to the object. In another embodiment, the method may include, inter alia, constructing a grid from modeling material, the grid being disposed within the support construction. In another embodiment, the method may include, inter alia, removing the support construction as a single unit. In another embodiment, the method may include, inter alia, leaving a space for the release layer between the object and the rigid construction. In another embodiment, the release layers may remain in a non-solidified state while exposed to radiation. In another embodiment, the release layers may partially solidify upon irradiation. In another embodiment, the release layers may be non-planar. In another embodiment, the method may include, inter alia, depositing the release layers at selected locations. In another embodiment, the method may include, inter alia, constructing a plurality of direction indicators, the indicators indicating an order of priority in removal of the support constructions. In another embodiment, the method may include, inter alia, constructing the support construction with a tapered shape in the direction of preferred removal. In another embodiment, the method may include, inter alia, depositing on the support construction support construction indicators. In another embodiment, the support construction may include, inter alia, modeling material, support material and any combination thereof. In another embodiment, the release construction may include, inter alia, modeling material, support material and any combination thereof.

One embodiment of the present invention further provides a method of constructing a three dimensional object, the method may include, inter alia, depositing interface material, and constructing for the interface material indicators indicating a preferable removal instruction for at least portions of the interface materials. In another embodiment, the method may include, inter alia, displaying the direction indicator on an output device. In another embodiment, the indicators may include, inter alia, an order of disassembly. In another embodiment, the indicators may include, inter alia, visible printing.

One embodiment of the present invention further provides an object printing method, comprising dispensing a plurality of layers of interface material in a predetermined arrangement, such that the outer shell of a printed mold includes predominantly modeling material, and the interior of the printed mold includes predominantly support material. In another embodiment, the method may include, inter alia, constructing a grid of modeling material within the support material. In another embodiment, the method may include, inter alia, curing the mold. In another embodiment, the method may include, inter alia, casting the mold. In another embodiment, the method may include, inter alia, heating the mold.

In one embodiment of the present invention, interface material may include, inter alia, modeling material, support material and any combination thereof.

One embodiment of the present invention further provides an apparatus for printing a three-dimensional object, including, inter alia, a controller to enable depositing a first portion of a layer of interface material, and depositing an additional portion of the layer of interface material, the additional portion separated from the first portion by a space, wherein the first portion, the additional portion, and the space are disposed within the same plane. In another embodiment, the controller is to enable formation of one or more non-continuous segments within the layer. In another embodiment, the controller is to enable filling the space. In another embodiment, the controller is to enable depositing an additional layer in an additional plane, the additional layer including an additional space, the space and the additional space being displaced when viewed perpendicular to the additional plane. In another embodiment, the controller is to enable depositing additional displaced layers.

One embodiment of the present invention further provides an apparatus for printing a three-dimensional object, including, inter alia, a controller to enable constructing a support construction, constructing a rigid exterior around the support construction, and constructing a release layer around the rigid exterior, the release layer being between the rigid exterior and the object. In another embodiment, the rigid exterior may have a substantially similar strength and elasticity to the object. In another embodiment, the controller is to enable constructing a grid from modeling material, the grid disposed within the support construction. In another embodiment, the controller is to enable removal of the support construction as a whole. In another embodiment, the controller is to enable leaving a space for the release layer between the object and the support construction. In another embodiment, one or more release layers may remain in a non-solidified state while exposed to radiation. In another embodiment, one or more release layers may partially solidify upon irradiation. In another embodiment, one or more release layers may be non-planar. In another embodiment, one or more release layers may be deposited at selected locations. In another embodiment, the controller is to enable constructing a plurality of direction indicators, the indicators indicating an order of priority in removal of the support constructions. In another embodiment, the controller is to enable constructing the support construction with a tapered shape in the direction of preferred removal. In another embodiment, the controller is to enable depositing on the support construction support construction indicators.

One embodiment of the present invention further provides an apparatus for printing a three-dimensional object, including, inter alia, a controller to enable constructing an interface layer, and constructing for the interface layer indicators indicating instructions for at least portions of the interface materials. In another embodiment, the indicators are to be displayed on an output device. In another embodiment, the indicators may include, inter alia, indications of an order of disassembly. In another embodiment, the indicators may include, inter alia, visible printing.

One embodiment of the present invention further provides an apparatus for printing a three-dimensional object, including, inter alia, a controller to enable dispensing a plurality of layers of interface material in a predetermined arrangement, such that the outer shell of a printed mold includes predominantly modeling material, and the interior of the printed mold includes predominantly support material. In another embodiment, the controller is to enable constructing a grid of modeling material within the support material. In another embodiment, the controller is to enable curing the mold.

In one embodiment of the present invention, interface material may include, inter alia, modeling material, support material and any combination thereof.

In one embodiment, the present invention provides a pseudo composite material, including, inter alia, a first phase and a second phase, wherein each phase may include, inter alia, an organic compound, wherein each phase comprises a multiplicity of construction layers, wherein the layers are deposited by ink-jet printing, wherein the pseudo composite material exhibits a non-homogeneous three-dimensional structure.

In another embodiment, the pseudo composite material may further include, inter alia, one or more phases, wherein each phase comprises a multiplicity of construction layers.

In one embodiment, the present invention provides a three-dimensional object including, inter alia, a pseudo composite material, wherein the pseudo composite material may include, inter alia, a first phase and a second phase, wherein each phase may include, inter alia, an organic compound, wherein each phase comprises a multiplicity of construction layers, wherein the layers are deposited by ink-jet printing, wherein the pseudo composite material exhibits a non-homogeneous three-dimensional structure.

In another embodiment, the three-dimensional object may further include, inter alia, one or more phases, wherein each phase comprises a multiplicity of construction layers.

In another embodiment, the three-dimensional object may further include, inter alia, one or more phases, wherein each phase comprises a multiplicity of construction layers.

In another embodiment, the three-dimensional object may further include, inter alia, a multiplicity of support layers for supporting the construction layers of the three-dimensional object. In another embodiment, the support layers are any support layers according to the invention.

In another embodiment, the three-dimensional object may further include, inter alia, a multiplicity of release layers for releasing the support layers, wherein the release layers are positioned between the support layers and the construction layers. In another embodiment, the release layers are any release layers according to the invention.

In one embodiment, the present invention provides a method for the preparation of a pseudo composite material having a non-homogeneous three-dimensional structure, the method may include, inter alia, the steps of dispensing a first phase composition from a first dispenser to produce a first phase, wherein the first phase may include, inter alia, an organic compound, dispensing a second phase composition from a second dispenser to produce a second phase, wherein the second phase may include, inter alia, an organic compound, whereby depositing a multiplicity of construction layers, curing or solidifying the first phase composition and the second phase composition, thereby producing a pseudo composite material having a non-homogeneous three-dimensional structure.

In another embodiment, the method for the preparation of a pseudo composite material having a non-homogeneous three-dimensional structure, may further include, inter alia, the step of producing one or more phases, wherein each phase comprises a multiplicity of construction layers.

In another embodiment of the present invention, the method for the preparation of a pseudo composite material having a non-homogeneous three-dimensional structure may be used, inter alia, for the preparation of a three-dimensional object.

In one embodiment, the present invention provides a method for the preparation of a three-dimensional object, the method may include, inter alia, the preparation of a pseudo composite material having a non-homogeneous three-dimensional structure, the method may include, inter alia, the steps of dispensing a first phase composition from a first dispenser to produce a first phase, wherein the first phase may include, inter alia, an organic compound, dispensing a second phase composition from a second dispenser to produce a second phase, wherein the second phase may include, inter alia, an organic compound, whereby depositing a multiplicity of construction layers, curing or solidifying the first phase composition and the second phase composition, thereby producing a pseudo composite material having a non-homogeneous three-dimensional structure, thereby producing a three-dimensional object.

In another embodiment, the method for the preparation of a three-dimensional object, may further include, inter alia, the step of producing one or more phases, wherein each phase comprises a multiplicity of construction layers. In another embodiment, the method for the preparation of a three-dimensional object, may further include, inter alia, the step of producing a multiplicity of support layers for supporting the construction layers of the three-dimensional object. In another embodiment, the method for the preparation of a three-dimensional object, may further include, inter alia, the step of producing a multiplicity of release layers for releasing the support layers, wherein the release layers are positioned between the support layers and the construction layers.

In one embodiment of the present invention, at least one construction layer may include, inter alia, the first phase composition and the second phase composition.

In one embodiment of the present invention, curing or solidifying are performed immediately after deposition of one construction layer. In another embodiment, curing or solidifying are performed after deposition of more than one construction layers. In another embodiment, curing or solidifying are performed during deposition of the construction layers. In another embodiment, curing is performed at a controlled temperature. In another embodiment, the temperature is higher than 25° C.

In one embodiment, the present invention provides printer for printing a pseudo composite material, including, inter alia a controller to enable producing a first phase and a second phase, wherein each of the first phase and the second phase may include, inter alia, an organic compound, thereby producing a pseudo composite material having a non-homogeneous three-dimensional structure. In another embodiment, the apparatus may further include at least two dispensers. In another embodiment, the apparatus may further include at least three dispensers. In another embodiment, different phase combinations may be used. In another embodiment, the apparatus may be used, inter alia, for the preparation of a three-dimensional object.

In one embodiment of the present invention, the first phase is structurally different from the second phase. In another embodiment, the first phase is chemically different from the second phase. In another embodiment, the first phase exhibits different properties from the second phase.

In one embodiment of the present invention, the first phase may be produced by dispensing a first phase composition and the second phase may be produced by dispensing a second phase composition.

In one embodiment of the present invention, the first phase composition, the second phase composition or both may include, inter alia, a curable component. In another embodiment, the curable component may be electron beam curable, electromagnetic radiation curable, thermo-curable or any combination thereof.

In one embodiment of the present invention, the first phase composition, the second phase composition or both may include, inter alia, a first interface material, wherein the first phase composition and the second phase composition are not identical. In another embodiment, the first interface material is any first interface material according to the invention.

In one embodiment of the present invention, the first phase composition, the second phase composition or both may include, inter alia, a first interface material and a second interface material in a pre-determined proportions, wherein the first phase composition and the second phase composition are not identical. In another embodiment, the first and/or second interface materials are any first and/or second interface material according to the invention.

In one embodiment of the present invention, the first phase composition, the second phase composition or both may include, inter alia, any composition suitable for building a three-dimensional object according to the invention. In another embodiment, the first phase composition, the second phase composition or both may include, inter alia, any composition suitable for support in building a three-dimensional object according to the invention.

In one embodiment of the present invention, at least one phase of the pseudo composite material may be a continuous phase. In another embodiment, at least one phase may be a non-continuous phase.

In one embodiment of the present invention, the properties of the pseudo composite material may be, inter alia, isotropic properties, un-isotropic properties or a combination thereof. In another embodiment, the properties may be, inter alia, mechanical, thermo-mechanical, optical, acoustic, electrical properties or any combination thereof.

In another embodiment, the mechanical strength of the pseudo composite material along one axis of the material may be higher than the mechanical strength of the material along another axis of the material.

In another embodiment, the elasticity of the pseudo composite material along one axis of the material may be higher than the elasticity of the material along another axis of the material.

In another embodiment, the refractive index of the pseudo composite material along one axis of the material may be different than the refractive index of the material along another axis of the material. In another embodiment, the refractive index of the material along one axis may vary.

BRIEF DESCRIPTION OF THE DRAWINGS

The present invention will be understood and appreciated more fully from the following detailed description taken in conjunction with the appended drawings in which:

FIGS. 5C-5D are schematic illustrations of printed objects and associated release layers, according to some embodiments of the present invention;

FIG. 5E is a schematic illustration of a printed object with removal indicators, according to an embodiment of the present invention;

FIG. 5F is a flow chart illustration of an exemplary method of 3-D printing using indicators, according to an embodiment of the present invention;

DETAILED DESCRIPTION OF THE PRESENT INVENTION

The following description is presented to enable one of ordinary skill in the art to make and use the invention as provided in the context of a particular application and its requirements. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In other instances, well-known methods, procedures, and components have not been described in detail so as not to obscure the present invention.

Embodiments of the present invention relates to compositions for use in the manufacture of three-dimensional objects, and to compositions for use as support and/or release material in the manufacture of three-dimensional objects. Embodiments of the present invention further relate to methods method for the preparation of a three-dimensional object by three-dimensional printing, using the above-mentioned compositions, and to a three-dimensional object obtained by the method.

The composition for use in the manufacture of the three-dimensional objects may include, inter alia, at least one reactive component, at least one photo-initiator, at least one surface-active agent and at least one stabilizer. The composition may be formulated so as to be compatible for use with ink-jet printers and to have a viscosity at room temperature above 50 cps.

The composition for use as a support and/or second interface material in the manufacture of the three-dimensional objects may include, inter alia, at least one non-reactive and low-toxicity component, at least one surface-active agent and at least one stabilizer. The composition may further contain at least one reactive component and at least one photo-initiator. The composition is formulated so as to be compatible for use with ink-jet printers and to have a viscosity at room temperature above 50 cps.

The compositions will be described in further detail below.

Figure 1:
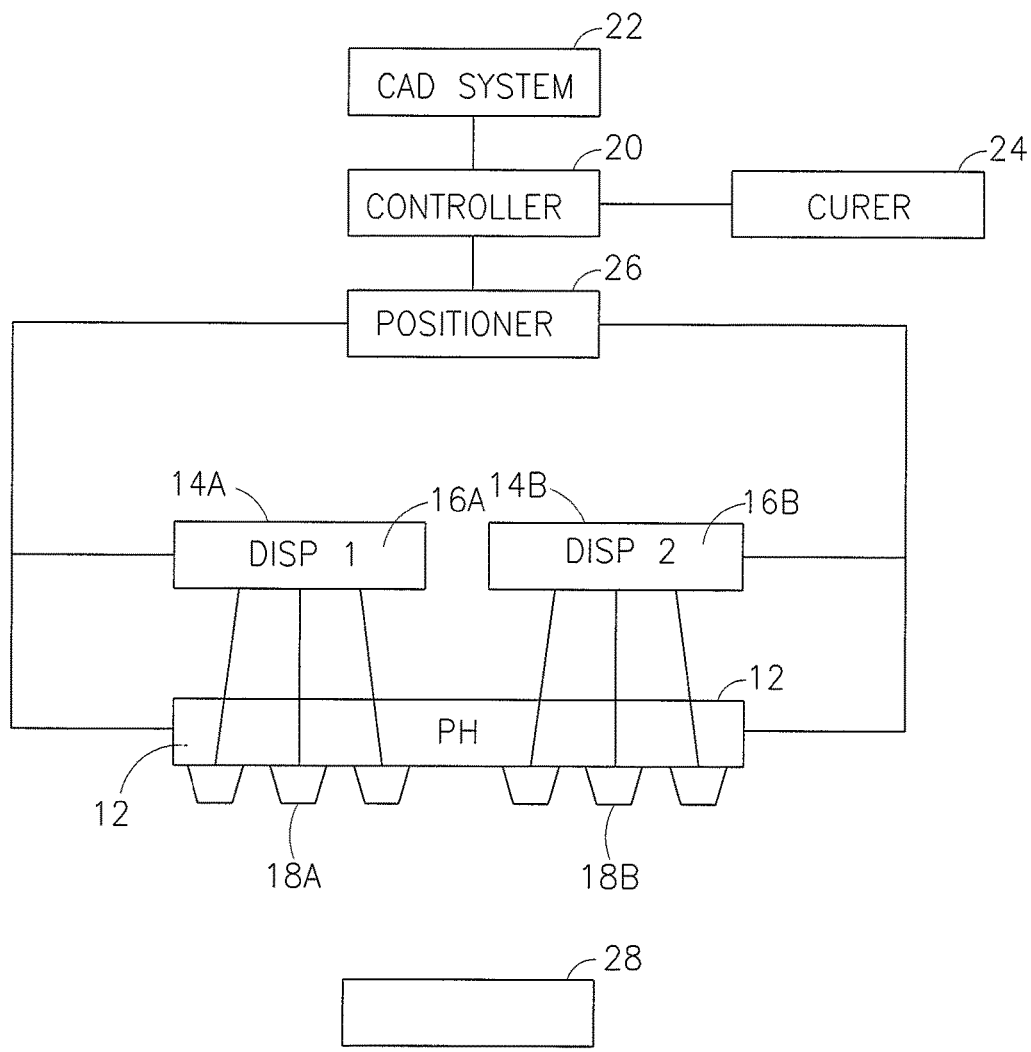
FIG. 1 is a schematic illustration of an embodiment of a three-dimensional printing system.

The three-dimensional object according to embodiments of the present invention may be built using, for example, a three-dimensional printing system similar to embodiments of U.S. patent application Ser. No. 09/412,618, assigned to the Assignees of the present application and incorporated herein by reference, although other suitable three-dimensional printers may be used. A three-dimensional printing system is shown in FIG. 1, to which reference is now made. FIG. 1 is an illustration of a three-dimensional printing system, generally designated 10, which includes one or more printing heads, referenced 12, and at least two dispensers generally referenced 14 and individually referenced 14a and 14b, containing interface materials, generally referenced 16 and individually referenced 16a and 16b, respectively. Other components, and other sets of components, may be used.

Printing head 12 has a plurality of ink-jet type nozzles 18, through which interface materials 16a and 16b are jetted. In one embodiment of the present invention, first dispenser 14a is connected to a first set of nozzles, referenced 18a, and second dispenser 14b is connected to a second set of nozzles, referenced 18b. Thus first interface material 16a is jetted through nozzles 18a, and second interface material 16b is jetted through nozzles 18b. Alternatively, in another embodiment (not shown), the three-dimensional printing system may include at least two printing heads. The first printing head is connected to first dispenser 14a and is used to jet first interface material 16a; and the second printing head is connected to second dispenser 14b is used to jet second interface material 16b.

The three-dimensional printing system 10 further includes a controller 20, a Computer Aided Design (CAD) system 22, curing unit 24, and optionally a positioning apparatus 26. The controller 20 is coupled to the CAD system 22, curing unit 24, positioning apparatus 26, printing head 12 and each of the dispensers 14. Control may be affected by other units than shown, such as one or more separate units.

The three-dimensional object being produced (28) is built in layers, the depth of each layer typically being controllable by selectively adjusting the output from each of the ink-jet nozzles 18.

By combining or mixing materials from each of the dispensers, wherein each dispenser contains interface material having a different hardness, it is possible to adjust and control the hardness of the material forming the three-dimensional object being produced. Thus, by combining the first and second interface materials being output from each of the dispensers, respectively, different parts of the three-dimensional object having a different modulus of elasticity and a different strength may be produced.

As used hereinafter, the term "strength" is used as a relative term to indicate the difference in modulus of elasticity among interface materials. The strength of a material may be described, for example, by reference to its modulus of elasticity, which may be defined as: "the ratio of stress to its corresponding strain under given conditions of load, for materials that deform elastically, according to Hooke's law".

In accordance with one embodiment of the present invention, the first dispenser 14a contains a first interface material 16a, referred to hereinafter as the "first interface material" or "first composition", and the second dispenser 14b contains a second interface material 16b, referred to hereinafter as the "second interface material" or "second composition". The first interface material has a different (harder) modulus of elasticity and a greater strength than the second interface material. By combining the first interface material and the second interface material, different layers of the three-dimensional object having a different modulus of elasticity and a different strength may be produced, such as, for example, a model or "construction" layer (otherwise known as a model construction), a support layer (otherwise known as a support construction) and a release layer (otherwise known as a release construction), as defined herein. In accordance with embodiments of the present invention, each layer of materials deposited by the apparatus during the printing process, may include a combination of model constructions, support constructions and/or release constructions, according to the requirements of the three-dimensional object being printed. Thus, when referring herein to construction layers, support layers and/or release layers, any or all of these may be part or parts comprising a single whole 'layer' printed by the printing apparatus during the printing process.

For example, combining the first interface material and the second interface material forms a multiplicity of construction layers, which are defined as the layers constituting the three-dimensional object. Multiplicity, as used hereinafter, refers to a number which is one or greater.

Further, combining the first interface material and the second interface material may form a multiplicity of support layers, which are defined as the layers supporting the three-dimensional object, and not constituting the three-dimensional object.

Further, combining the first interface material and the second interface material may form a multiplicity of release layers, which are defined as the layers (not constituting the three-dimensional object) for separating the three-dimensional object layer from layers such as the support layers. The release layers typically have a lower modulus of elasticity and a lower strength than the construction layers and the support layers.

In one embodiment of the present invention, the support layers are designed substantially exactly as the construction layers, and thus have substantially the same modulus of elasticity and substantially the same strength as the construction layers. In this way, the construction layers form a core, and the support layers look like the negative printing of the core. The release layers are positioned between the construction layers and the support layers, and are used to separate the construction layers from the support layers.

In one embodiment of the present invention, the support layers have a lower modulus of elasticity and a lower strength than the construction layers. The support layers may be separated from the construction layers by taking advantage of their weaker properties, as will be explained in detail below. Alternatively, the support layers may be separated from the construction layers by positioning release layers between the construction layers and the support layers.

Figure 2:
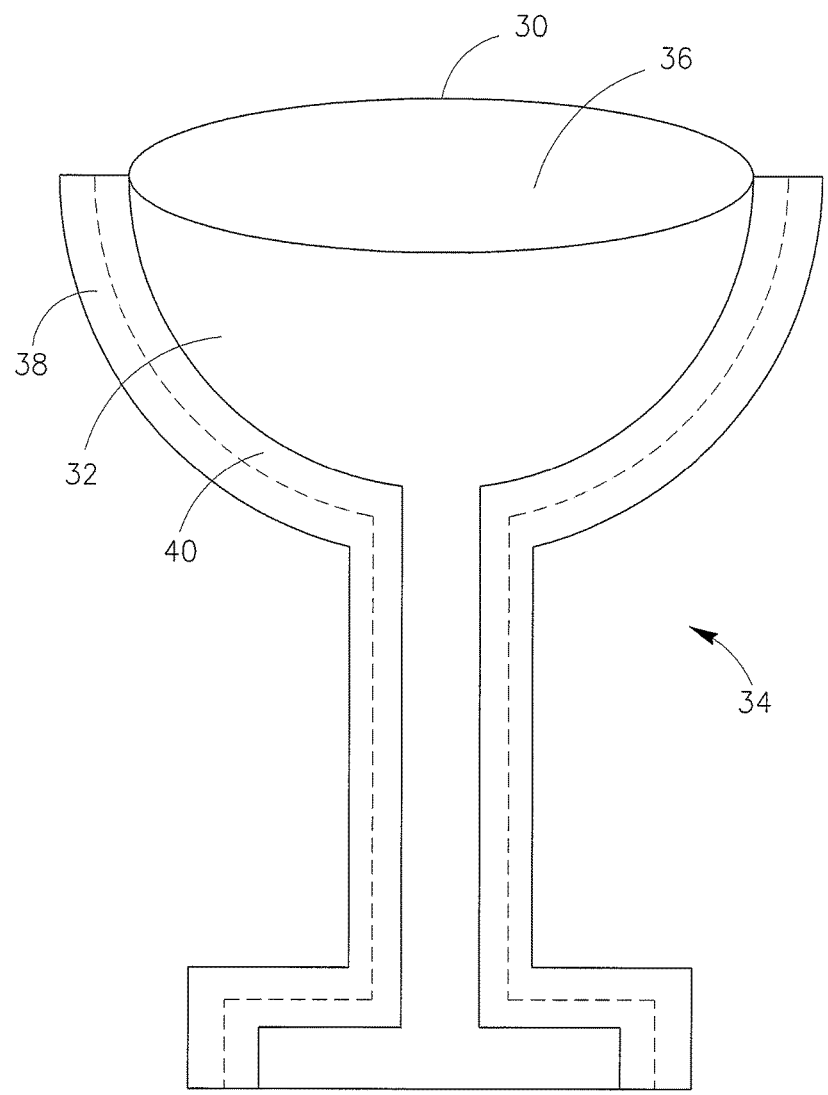
FIG. 2 is an elevational view of a three-dimensional object, constructed in accordance with an embodiment of the present invention.

In order to more clearly define the present invention, reference is now made to FIG. 2, which is a three-dimensional model of a wineglass, generally referenced 30. This three-dimensional model is printed using the ink-jet type printing system of FIG. 1. combining the first interface material and the second interface material to form a multiplicity of construction layers 32 which make up wine glass 30.

The construction layers 32 of wineglass 30 need to be supported externally, such as in the area referenced 34. Furthermore, an internal void, referenced 36, needs to be formed during printing. Thus a multiplicity of support layers 38, formed by combining the first interface material and the second interface material, are printed.

Furthermore, combination of the first interface material and the second interface material forms a multiplicity of release layers 40. In one embodiment of the present invention, release layers 40 are positioned between construction layers 32 and support layers 38. Generally, release layers 40 have a different (lower) modulus of elasticity than support layers 38 and construction layers 32. Thus release layers 40 may be used to separate support layers 38 from construction layers 32.

The present invention, which will now be described in detail, provides, inter alia, compositions suitable for use as the first interface and as the second interface material.

The first interface material and second interface material according to embodiments of the present invention are especially designed and formulated for building a three-dimensional object using three-dimensional printing. Accordingly, in accordance with an embodiment of the present invention, the first interface material and the second interface material each have a first viscosity at room temperature, and a second viscosity compatible with ink-jet printers at a second temperature, which may be the same or different, wherein the second temperature is higher than room temperature, which is defined as about 20-30° C.

In one embodiment of the present invention, the first and the second interface materials are designed to have increased viscosity at room temperature, which is defined as about 20-30° C. In another embodiment, the first and second interface material have a viscosity greater than 50 cps at room temperature, In another embodiment, the viscosity may be between 80 and 300 cps. In another embodiment, the first and the second interface material may have a viscosity of around 300 cps at room temperature.

In one embodiment of the present invention, the first interface material and the second interface material may have a second viscosity compatible with ink-jet printing, at a second temperature which may be higher than room temperature. In another embodiment, a composition compatible with ink-jet printing may have a low viscosity, for example, below 20 cps at the printing temperature, in order to function properly in the printing process. In another embodiment, the first interface material and the second interface material, upon heating, have a viscosity preferably below 20 cps that may enable the construction of the three-dimensional object under heat. In one embodiment of the present invention, the temperature typically used to build the three-dimensional model is higher than 60° C. In another embodiment, the temperature may be about 85° C. In one embodiment of the present invention, the first and second interface materials may have a viscosity of 8-15 cps at a temperature greater than 60° C. In another embodiment, the first and second interface materials may have a viscosity of 11 cps at a temperature of about 85° C.

Having this viscosity, the first and second interface material in one embodiment may be distinguished from prior art formulations designed for ink-jet printing, which have low viscosity at room temperature, the temperature at which the printing is normally conducted. High viscosity at room temperature is a desirable property for three-dimensional objects, a feature that is lacking in the prior art formulations. Of course, other embodiments may have other viscosities.

First Interface Material

The first interface material (typically, the model material) is a composition suitable for building a three-dimensional object. The composition may be formulated to give, after curing, a solid material. In one embodiment, this invention describes a composition that after curing results in a solid material, with mechanical properties that permit the building and handling of that three-dimensional object. In a another embodiment, this invention provides a composition that upon curing results in a solid elastomer like material, with mechanical properties that permit the building and handling of the three-dimensional object One embodiment of the present invention provides a first interface material may include, inter alia, at least one reactive component, at least one photo-initiator, at least one surface-active agent and at least one stabilizer.

One embodiment of the present invention provides a composition suitable for building a three-dimensional object, the composition may include, inter alia, a curable component, having a functional group, wherein if the functional group is a polymerizable reactive functional group, then the functional group is a (meth)acrylic functional group, a photo-initiator, a surface-active agent and a stabilizer, wherein the composition has a first viscosity of about 50-500 cps at a first temperature, wherein the first temperature is ambient temperature, and a second viscosity lower than 20 cps at a second temperature wherein the second temperature is higher than the first temperature, wherein, after curing, the composition results in a solid form.

In one embodiment of the present invention, the first temperature is a room temperature. In another embodiment, the room temperature is between 20-30° C. In another embodiment, the first temperature is ambient temperature. In another embodiment, ambient temperature is between 10-40° C. In another embodiment, ambient temperature is between 15-35° C. In another embodiment, ambient temperature is between 20-30° C.

In one embodiment of the present invention, the second temperature is higher than 40° C. In another embodiment, the second temperature is higher than 50° C. In another embodiment, the second temperature is higher than 60° C. In another embodiment, the second temperature is higher than 70° C.

In one embodiment of the present invention, the curable component is a reactive component, which is able to undergo polymerization. In one embodiment of the present invention, the curable component may be a (meth)acrylic monomer, a (meth)acrylic oligomer, a (meth)acrylic crosslinker, or any combination thereof.

In one embodiment of the present invention, the curable component may be a combination of a mono-functional monomer and a di-functional oligomer.

In one embodiment of the present invention, the mono-functional monomer is a high Glass Transition Temperature mono-functional monomer. In another embodiment, the di-functional oligomer is a low Glass Transition Temperature di-functional oligomer. The term Glass transition temperature (Tg) is defined as the temperature at which a polymer changes from hard and brittle to soft and pliable material.

In one embodiment of the present invention, the Glass Transition Temperature of the mono-functional monomer may be higher than 60° C. In another embodiment, the Glass Transition Temperature of the mono-functional monomer may be higher than 70° C. In another embodiment, the Glass Transition Temperature of the mono-functional monomer may be in the range of 70-110° C.

In one embodiment of the present invention, the Glass Transition Temperature of the di-functional oligomer may be lower than 40° C. In another embodiment, the Glass Transition Temperature of the di-functional oligomer may be lower than 30° C. In another embodiment, the Glass Transition Temperature of the di-functional oligomer may be in the range of 20-30° C.

One embodiment of the present invention provides a composition wherein the Glass Transition Temperature of the mono-functional monomer is higher than 70° C. and wherein the Glass Transition Temperature of the di-functional oligomer is lower than 40° C.

In one embodiment of the present invention, the composition may include at least 20% of the high Glass Transition Temperature mono-functional monomer. In another embodiment, the composition may include at least 30% of the high Glass Transition Temperature mono-functional monomer. In another embodiment, the composition may include at least 40% of the high Glass Transition Temperature mono-functional monomer. In another embodiment, the composition may include between 20-40% of the high Glass Transition Temperature mono-functional monomer. In another embodiment, the composition may include between 30-60% of the high Glass Transition Temperature mono-functional monomer.

In one embodiment of the present invention, the composition may include about 20% of the low Glass Transition Temperature di-functional oligomers. In another embodiment, the composition may include about 40% of the low Glass Transition Temperature di-functional oligomers. In another embodiment, the composition may include between 20-40% of the low Glass Transition Temperature di-functional oligomers. In another embodiment, the composition may include at least 20% of the low Glass Transition Temperature di-functional oligomer. In another embodiment, the composition may include not more than 40% of the low Glass Transition Temperature di-functional oligomer.

In one embodiment of the present invention, the composition may include at least 40% of the high Glass Transition Temperature mono-functional monomers and at least 20% of the low Glass Transition Temperature di-functional oligomer.

In one embodiment of the present invention, the composition may include at least 20% of the high Glass Transition Temperature mono-functional monomers and not more than 40% of the low Glass Transition Temperature di-functional oligomer.

An acrylic monomer is a functional acrylated molecule which may be, for example, esters of acrylic acid and methacrylic acid. Momoners may be mono-functional or multifunctional (for example, di-, tri-, tetra-functional, and others). An example of an acrylic mono-functional monomer according to an embodiment of the present invention is phenoxyethyl acrylate, marketed by Sartomer under the trade name SR-339. An example of an acrylic di-functional monomer is propoxylated (2) neopentyl glycol diacrylate, marketed by Sartomer under the trade name SR-9003.

An acrylic oligomer is a functional acrylated molecule which may be, for example, polyesters of acrylic acid and methacrylic acid. Other examples of acrylic oligomers are the classes of urethane acrylates and urethane methacrylates. Urethane-acrylates are manufactured from aliphatic or aromatic or cycloaliphatic diisocyanates or polyisocyanates and hydroxyl-containing acrylic acid esters. An example is a urethane-acrylate oligomer marketed by Cognis under the trade name Photomer-6010.

An acrylic crosslinker is a molecule which may provide enhanced crosslinking density. Examples of such resins are Ditrimethylolpropane Tetra-acrylate (DiTMPTTA), Pentaerythitol Tetra-acrylate (TETTA), Dipentaerythitol Penta-acrylate (DiPEP). In one embodiment of the present invention, the composition may further includes, inter alia, a curable component, which is a molecule having one or more epoxy substituents, a molecule having one or more vinyl ether substituents, vinylcaprolactam, vinylpyrolidone, or any combination thereof. In one embodiment of the present invention, the composition may further include, inter alia, vinylcaprolactam. Other curable components may also be used.

The first interface material may also include a curable component which is, for example, a molecule having one or more vinyl ether substituents. In one embodiment of the present invention, the concentration of component that includes a molecule having one or more vinyl ether substituents is in the range of 10-30%. In another embodiment, the concentration is 15-20%. In another embodiment, the concentration is 15%. Of course, other concentrations, and other ranges, can be used. Conventional vinyl ether monomers and oligomers which have at least vinyl ether group are suitable. Examples of vinyl ethers are ethyl vinyl ether, propyl vinyl ether, isobutyl vinyl ether, cyclohexyl vinyl ether, 2-ethylhexyl vinyl ether, butyl vinyl ether, ethyleneglocol monovinyl ether, diethyleneglycol divinyl ether, butane diol divinyl ether, hexane diol divinyl ether, cyclohexane dimethanol monovinyl ether and the like. An example of a vinyl ether according to an embodiment of the present invention is 1,4 cyclohexane dimethanol divinyl ether, marketed by ISP under the trade name CHVE.

In one embodiment of the present invention, the first interface material may also include a curable component which is a molecule having one or more epoxy substituents. In one embodiment of the present invention, conventional epoxy monomers and oligomers which have at least one oxirane moiety may be used. Non-limiting examples of suitable epoxy containing molecules are displayed in Table 1 below (note other suppliers may be used for suitable materials):

TABLE 1

Examples of epoxy-containing curable component

| Trade Name | Type of Material | Supplier |
| --- | --- | --- |
| ERL-4299 or UVR-6128 | Bis-(3,4 cyclohexylmethyl) adipate | Union Carbide |
| UVR-6105 and UVR-6110 | 3,4-epoxy cyclohexylmethyl-3,4-epoxycyclohexyl carboxylate | Union Carbide |
| D.E.R 732 | Aliphatic epoxy, Polyglycol diglycidyl ether | Dow chemicals |
| Vinylcyclohexene Monoxide | 1,2 epoxy-4-vinylcyclohexane | Union Carbide |
| D.E.N. 431 | Epoxy novolac resin | Dow corning |
| UVR-6216 | 1,2-epoxy hexadecane | Union Carbide |
| UVI-6100 | Cycloaliphatic epoxide diluent | Union Carbide |
| Vikoflex 7170 | Fullyl epoxidized soy bean oil | Elf Atochem, INC. |
| ERL-4221D | 3,4-epoxy cyclohexylmethyl 3,4-epoxy cyclohexane carboxylate | Union Carbide |

In one embodiment of the present invention, the first interface material may include any combination of an acrylic component as defined herein, a molecule having one or more epoxy substituents as defined herein, a molecule having one or more vinyl ether substituents as defined herein, vinylcaprolactam and vinylpyrolidone.

In one embodiment of the present invention, the curable component of the first interface material includes, inter alia, an acrylic monomer, an acrylic oligomer, an acrylic crosslinker and vinylcaprolactam. In another embodiment, the curable component includes an acrylic component as defined herein and a molecule having one or more epoxy substituents as defined herein. In another embodiment, the curable component of the first interface material includes an acrylic component as defined herein and a molecule having one or more vinyl ether substituents as defined herein. In another embodiment, the curable component in the first interface material includes a molecule having one or more vinyl ether substituents as defined herein, and a molecule having one or more epoxy substituents as defined herein.

The photo-initiator of the first interface material and of the second interface material may be the same or different, and is a free radical photo-initiator, a cationic photo-initiator, or any combination thereof.

The free radical photo-initiator may be any compound that produces a free radical on exposure to radiation such as ultraviolet or visible radiation and thereby initiates a polymerization reaction. Non-limiting examples of some suitable photo-initiators include benzophenones (aromatic ketones) such as benzophenone, methyl benzophenone, Michler's ketone and xanthones; acylphosphine oxide type photo-initiators such as 2,4,6-trimethylbenzolydiphenyl phosphine oxide (TMPO), 2,4,6-trimethylbenzoylethoxyphenyl phosphine oxide (TEPO), and bisacylphosphine oxides (BA-PO's); benzoins and bezoin alkyl ethers such as benzoin, benzoin methyl ether and benzoin isopropyl ether and the like. Examples of photo-initiators are alpha-amino ketone, marketed by Ciba Specialties Chemicals Inc. (Ciba) under the trade name Irgacure 907, and bisacylphosphine oxide (BAPO's), marketed by Ciba under the trade name 1-819.

The free-radical photo-initiator may be used alone or in combination with a co-initiator. Co-initiators are used with initiators that need a second molecule to produce a radical that is active in the UV-systems. Benzophenone is an example of a photoinitiator that requires a second molecule, such as an amine, to produce a curable radical. After absorbing radiation, benzophenone reacts with a ternary amine by hydrogen abstraction, to generate an alpha-amino radical which initiates polymerization of acrylates. Non-limiting example of a class of co-initiators are alkanolamines such as triethylamine, methyldiethanolamine and triethanolamine.

Suitable cationic photo-initiators according to embodiments of the present invention may include compounds which form aprotic acids or Bronstead acids upon exposure to ultraviolet and/or visible light sufficient to initiate polymerization. The photo-initiator used may be a single compound, a mixture of two or more active compounds, or a combination of two or more different compounds, i.e. co-initiators. Non-limiting examples of suitable cationic photo-initiators are aryldiazonium salts, diaryliodonium salts, triarylsulphonium salts, triarylselenonium salts and the like. In one embodiment, a cationic photo-initiator for the present invention may be a mixture of triarylsolfonium hexafluoroantimonate salts marketed by Union Carbide as UVI-6974.

In one embodiment of the present invention, the composition suitable for building a three-dimensional object, may further include a curable compound, which is a sulfur-containing component. In one embodiment of the present invention, the sulfur-containing component is beta mercaptopropionate, mercapto acetate, alkane thiols or any combination thereof. The addition of sulfur-containing components may significantly enhance the composition reactivity. At levels of about 5% of sulfur-containing component a significant reactivity enhancement is achieved. The mechanical properties of the composition may be determined depending on the sulfur-containing component used. The reactivity enhancement achieved by the use of sulfur-containing component, enables the incorporation in the polymerization reaction of non sulfur-containing components, which would not easily polymerize otherwise. Molecules having unsaturated double bonds, for example, low molecular weight polybuthadiene, is polymerized in the claimed compositions when it contains an appropriate sulfur-containing component. For example, a basic composition will contain 15% low molecular weight unsaturated molecule, 5% sulfur-containing component, 15% monofunctional monomer, 15% di-functional monomer and the rest other curable components according to the intended photopolymer properties. An example of a sulfur-containing component according to an embodiment of the present invention may be trimethylolpropane tri(3-mercaptopropionate), manufactured by BRUNO BOCK Chemische Fabrik GMBH & CO. Other suitable substances may be used.

In one embodiment of the present invention, the composition suitable for building a three-dimensional object, further includes, inter alia, a low molecular weight polymer. An example of a low molecular weight polymer according to an embodiment of the present invention may be Styrene-Butadiene-Methacrylate block copolymers (KRATON D), manufactured by Dow Corning. Other suitable substances may be used.

In one embodiment of the present invention, the composition suitable for building a three-dimensional object, further includes, inter alia, a filler.

The term filler is defined as an inert material added to a polymer, a polymer composition or other material to modify their properties and/or to adjust quality of the end products.

The filler may be an inorganic particle, for example calcium carbonate, silica and clay. Of course other filler substances may be used.

Fillers may be introduced in to polymer compositions in order to reduce shrinkage during polymerization or during cooling, for example to reduce the coefficient of thermal expansion, increase strength, increase thermal stability reduce cost and/or adopt rheological properties. The use of standard fillers has also some drawbacks such as reduction of elasticity and an increase in viscosity. Additionally, large diameter fillers (>5 micron) are not appropriate for ink-jet applications.

Nano-particles fillers are especially useful in applications requiring low viscosity such as ink-jet applications. Compositions containing as much as 30% nano-particle fillers are feasible, whereas the same concentration of more standard and higher diameter fillers (~>1 micron) produce at such concentration viscosities which are too high for ink-jet applications. In one embodiment of the present invention, the nano-particle filler containing composition is clear. The composition is clear (e.g. transparent) since it contains no visual fillers. In contrast, compositions containing more standard and higher diameter visible fillers (~>1 micron), are not clear.

In one embodiment of the present invention, the composition optionally may contain pigments. In another embodiment, the pigment concentration may be lower than 35%. In another embodiment, the pigment concentration may be lower than 15%.

In one embodiment of the present invention, the filler may include particles such as particles having an average diameter of less than 100 nm. In another embodiment, the filler may include particles having a diameter in the range of 10-100 nm. In another embodiment, the filler may include particles having a diameter in the range of 20-80 nm. In another embodiment, the filler may include particles having a diameter in the range of 10-50 nm. In another embodiment, the filler may include particles having a diameter smaller than 10 nm. Examples of fillers that may be used in the composition are HIGHLINK OG (particle size spanning between 9 nm to 50 nm), manufactured by Clariant, and NANOCRYL (particle size below 50 nm), manufactured by Hanse Chemie. Other suitable substances may be used.

It was discovered that phase separation may be induced during the radiation curing process of the present method. In one embodiment of the present invention, the phase separation may produce a clear material, which may have improved impact-resistance. This composition, upon bending develops micro-cracks, before breaking. These micro-cracks can easily be distinguished due to the whitening of the stress area or stress line. In another embodiment, the phase separation results in a non-clear cured material. It was discovered that certain combinations of UV curable components induce phase separation during curing. Such compositions are clear before curing and may be clear, hazy or opaque after curing. Such compositions have an improved impact strength and higher elongation, when compared to similar compositions, which do not show such phase separation. For example, it was discovered that the addition of some silicon containing oligomers, at levels as low as 5%, to the above described composition, may already create a substance which induces such phase separation. An example of a silicon acrylated molecule is Ebecryl 350, manufactured by UCB Chemicals. Of course other substances may be used.

One embodiment of the present invention provides a composition further includes a phase separation inducing component. In another embodiment, the phase separation inducing component is a silicon oligomer. In another embodiment, the concentration of the silicon oligomer is at least 5%.

In one embodiment of the present invention, phase separation may be induced during curing, resulting in a non-clear cured material. Certain combinations of UV curable composition suffer a phase separation process during curing. Such compositions are clear before curing and hazy to white after curing. Such compositions have an improved impact strength and higher elongation, when compared to similar compositions, which do not suffer from such phase separation. For example, the addition of some silicon containing oligomers, at levels as low as 5%, to the above described composition, may create a substance which suffers from such face separation.

In one embodiment of the present invention, the first viscosity is about 80-500 cps. In another embodiment, the first viscosity is about 300 cps. Of course, compositions having other viscosities may be used.

In one embodiment of the present invention, the second viscosity is lower than 20 cps and wherein the second temperature is higher than 60° C. In another embodiment, the second viscosity is between 10 and 17 cps and wherein the second temperature is higher than 60° C. In another embodiment, the second viscosity is between 10 and 17 cps and wherein the second temperature is about 70-110° C. In another embodiment, the second viscosity is between 12 and 15 cps and wherein the second temperature is about 70-90° C. Of course, compositions having other viscosities may be used.

Other components of the first interface material and the second interface material according to embodiments of the present invention may be surface-active agents and inhibitors (typically, thermal stabilizers). A surface-active agent may be used to reduce the surface tension of the formulation to the value required for jetting or for printing process, which is typically around 30 dyne/cm. An example of a surface-active agent according to an embodiment of the present invention may be silicone surface additive, marketed by Byk Chemie under the trade name Byk 307 Inhibitors may be employed in the formulations of the first interface material and the second interface material to permit the use of the formulation at high temperature, for example around 85° C., without causing thermal polymerization.

In one embodiment of the present invention, the composition may further include, inter alia, at least one pigment and at least one dispersant. In one embodiment of the present invention, the pigment may be a white pigment. In another embodiment, the pigment may be an organic pigment. In another embodiment, the pigment may be an inorganic pigment. In another embodiment, the pigment may be a metal pigment or a combination thereof. In one embodiment of the present invention, the composition may further include, inter alia, a dye. An example of a white pigment according to an embodiment of the present invention may be organic treated titanium dioxide, marketed by Kemira Pigments under the trade name UV TITAN M160 VEG. An example of an organic pigment according to an embodiment of the present invention may be an organic pigment marketed by Elementis Specialities under the trade name Tint Aid PC 9703. Examples of dispersants according to embodiments of the present invention may be dispersants including a copolymer with acidic groups marketed by Byk Chemie under the trade name Disperbyk 110, and a dispersant including a high molecular weight block copolymer with pigment affinic groups, marketed by Byk Chemie under the trade name Disperbyk 163. Furthermore, in one embodiment of the present invention, combinations of white pigments and dyes are used to prepare colored resins. In such combinations, the white pigment may have at least a double task: 1) to impart opacity; and 2) to shield the dye from UV radiation, to prevent bleaching of the resin. Thus, in accordance with one embodiment of the present invention, the first interface material further includes a dye. The dye may be chosen so as not to interfere with the curing efficiency of the formulation of the first interface material. The dye may be any of a broad class of solvent soluble dyes. Some non-limiting examples are azo dyes which are yellow, orange, brown and red; anthraquinone and triarylmethane dyes which are green and blue; and azine dye which is black. An example of a dye according to an embodiment of the present invention may be Solvent Red 127, marketed by Spectra Colors Corp. under the trade name Spectrasol RED BLG.

The relative proportions of the different components of the first interface material may vary. In one embodiment of the present invention, the first interface material includes the following components: 50% acrylic oligomer(s), 30% acrylic monomer(s), 15% acrylic crosslinker, 2% photoinitiator, surface active agent, pigments, and stabilizers. Of course, other compositions may be used.

Non-limiting examples of formulations of the first interface material are provided herein in Tables 2-4, to which reference is now made. Tables 2 and 3 illustrate examples of possible formulations of the first interface material. Table 4 illustrates examples of colored formulations, which include pigments, dispersants and dyes, as defined herein. To any of the examples in Tables 2 and 3 may be added the combination of the colorants of Table 4. The individual substances, suppliers, combinations, etc., are given by way of example only.

TABLE 2

Examples of Characteristic Formulation Components of First Interface Material

| # | Trade Name | Chemical Type | Function in the formulation | Supplier |
|---|---|---|---|---|
| A | Photomer-6010 | Urethane Acrylate Oligomer | Oligomer | Cognis |
| B | SR-339 | Phenoxy ethyl Acrylate | monomer | Sartomer |
| C | SR-351 | Trimethylol propane triacrylate | Cross-linker | Sartomer |
| D | Irgacure 907 | alpha-Amino Ketone | Free radical photo-initiator | Ciba Specialties Chemical Inc. |
| E | BP | Benzophenone | Free radical photo-initiator | Satomer |
| F | Triethanol Amine | Ternary Amine | Free radical Coinitiator | Sigma |
| G | Byk 307 | Silicone Surface Additive | Surface agent | Byk Chemie |
| H | MEHQ | 4-Methoxy phenol | Inhibitor | Sigma |
| I | Cyracure UVR-6110 | 3,4 Epoxycyclohexylmethyl-3,4-epoxycyclohexylcarboxylate | Epoxy oligomer | Union Carbide |
| J | UVI-6974 | Mixed Triarylsulfonium Hexafluoroantimonate Salts | Cationic photo-initiator | Union Carbide |
| K | CHVE | 1,4-cyclohexane dimethanol divinyl ether | Vinyl Ether Monomer | ISP |
| L | UV TITAN M160 VEG | Organic Treated Titanium Dioxide | White pigment | KEMIRA PIGMENTS |
| M | Disperbyk 110 | Copolimer with acidic groups | Pigment Dispersant | Byk Chemie |
| N | Spectrasol RED BLG | Solvent Red 127 | Dye | Spectra Colors Corp. |
| O | Tint Aid PC 9703 | Organic pigment | Organic pigment | Elementis Specialties |
| P | Disperbyk 163 | High molecular weight block copolymer with pigment affinic groups | Pigment Dispersant | Byk Chemie |
| Q | V-Cap | Vinylcaprolactam | Monomer | ISP |
| R | V-Pyrol | Vinylpyrolidone | Monomer | ISP |
| S | Silicon acrylated oligomer | Ebecryl 350 | Phase separation promoter | UCB Chemicals |
| T | Trimethylol propane tri(3-mercapto-propionate) | Sulfur-containing compound | Crosslinker | BRUNO BOCK Chemische Fabrik HMBH & CO. |

TABLE 3

Examples of Possible Formulation Compositions of First Interface Material

| Example | A | B | C | D | E | F | G | H | I | J | K | Q | R | S | T |
|---|---|---|---|---|---|---|---|---|---|---|---|---|---|---|---|
| 1  | X | X | X | X |   |   | X | X |   |   |   |   |   |   |   |
| 2  | X | X |   | X |   |   | X | X |   |   |   |   |   |   |   |
| 3  | X |   | X | X |   |   | X | X |   |   |   |   |   |   |   |
| 4  |   | X | X | X |   |   | X | X |   |   |   |   |   |   |   |
| 5  | X | X | X |   | X | X | X | X |   |   |   |   |   |   |   |
| 6  | X | X |   |   | X | X | X | X |   |   |   |   |   |   |   |
| 7  | X |   | X |   | X | X | X | X |   |   |   |   |   |   |   |
| 8  |   | X | X |   | X | X | X | X |   |   |   |   |   |   |   |
| 9  | X |   | X | X |   |   | X | X |   |   | X |   |   |   |   |
| 10 | X |   |   | X | X | X | X | X |   |   | X |   |   |   |   |
| 11 |   |   |   |   |   |   | X | X | X | X | X |   |   |   |   |
| 12 |   | X | X | X |   |   | X | X | X | X |   |   |   |   |   |
| 13 | X | X | X | X | X | X | X | X | X | X | X |   |   |   |   |
| 14 | X | X | X | X |   |   | X | X |   |   |   | X |   |   |   |
| 15 | X | X | X | X |   |   | X | X |   |   |   |   | X |   |   |
| 16 | X | X | X | X |   |   | X |   |   |   |   | X | X |   |   |
| 17 | X | X | X | X |   |   | X |   |   |   |   | X |   |   | X |

TABLE 4

Examples of colored formulations of first interface material

| Example | L | M | N | O | P |
|---|---|---|---|---|---|
| 16 | X | X |   |   |   |
| 17 | X | X | X |   |   |
| 18 | X | X |   | X | X |
| 19 |   |   |   | X | X |
| 20 |   |   | X | X | X |

In one embodiment of the present invention, the formulation of the first interface material is presented in entry No. 14 of Table No. 3. According one embodiment of the present invention, the first interface material includes:

an acrylic oligomer, which may be any acrylic oligomer as defined herein, and which may be an urethane acrylate oligomer;

an acrylic monomer, which may be any acrylic monomer as defined herein, and which may be phenoxy ethyl acrylate;

an acrylic crosslinker, which may be any acrylic crosslinker as defined herein, and which may be trimethylol propane triacrylate;

a radical photo-initiator, which may be any radical photo-initiator as defined herein, and which may be alpha-amino ketone;

a surface agent, which may be a silicone surface additive;

an inhibitor, which may be 4-methoxyphenol; and vinylcaprolactam.

Second Interface Material

The second interface material (in one embodiment, the support material) is a composition typically formulated to support the building of a three-dimensional object. In one embodiment of the present invention, the second interface material is formulated to form a release layer to permit a manual easy separation or cleaning of the three-dimensional object from its support.

In one embodiment of the present invention, the second interface material may be one of two different principle kinds: 1) a liquid material lacking any curable groups that remains liquid even after irradiation. In one embodiment, the liquid is water miscible and is easily washed out by water, or with other material. In another embodiment the liquid is non water-miscible and is easily washed out by water or by a water detergent solution and 2) a solid or semi-solid material that is formulated as a weak curable material. The solid or semi-solid material, when cured, may be capable of swelling in water or in alkaline or acidic water or water detergent solution. Thus, when cured, the second interface material may swell and almost break upon exposure to water, or in alkaline or acidic water or water detergent solution, with minimum manual work required. In both cases the second interface material is formulated so as to permit fast, easy and efficient removal of the second interface material and cleaning of the three-dimensional model from its support.

In one embodiment, the second interface material of the present invention may include, inter alia, at least one non-reactive and low toxicity compound, at least one surface-active agent and at least one stabilizer.

One embodiment of the present invention provides a composition suitable for support in building a three-dimensional object, the composition may include, inter alia, a non-curable component, a curable component, wherein the non-curable component is not reactive with the curable component, a surface-active agent, and a stabilizer, wherein the composition has a first viscosity of about 20-500 cps at a first temperature, wherein the first temperature is ambient temperature, and a second viscosity lower than 20 cps at a second temperature wherein the second temperature is higher than the first temperature, wherein, after irradiation, the composition results in a semi solid material. Of course, compositions having other viscosities may be used.

In one embodiment of the present invention, the composition suitable for support in building a three-dimensional object, after irradiation, may result in a semi-solid material. In another embodiment, the semi-solid material may be gel type material. In another embodiment, the composition may result in a liquid material. In another embodiment, the composition results in a solid material that is formulated as a weak curable material. In another embodiment, upon irradiation, the composition results in a material that is capable of swelling in water or in alkaline or acidic water. Thus, when irradiated, the second interface material swells and almost breaks upon exposure to water, with minimum manual work required.

In one embodiment of the present invention, the second interface material is formulated so as to permit fast, easy and efficient removal of the second interface material and cleaning of the three-dimensional model from its support.

In one embodiment of the second invention, the curable component is a reactive component. In another embodiment of the present invention, the reactive component can undergo polymerization. According to one embodiment, the second interface material is formulated as a curable composition that is capable of solidifying upon curing. In one embodiment of the second invention, the curable components may be similar to those used in the first interface material, but chosen specifically to give a hydrophillic cured resin, with weak mechanical properties. Thus, upon curing, a solid composition is formed that is weak and can be easily pulverized for example by hand or using water.

In one embodiment of the present invention, the curable component may be a (meth)acrylic component. In another embodiment, the (meth)acrylic component may be a (meth) acrylic monomer. In another embodiment, the (meth)acrylic component may be a (meth)acrylic oligomer. In another embodiment, the (meth)acrylic component may be a (meth) acrylic crsosslinker. In another embodiment, the (meth) acrylic component may be any combination of a (meth) acrylic monomer, a (meth)acrylic oligomer and a (meth) acrylic crsosslinker.

In one embodiment of the present invention, the composition may further include, inter alia, at least one photo-initiator. In one embodiment of the present invention, the photo-initiator may a free radical photo-initiator, a cationic photo-initiator, or any combination thereof. The photo-initiator may be any photo-initiator, as defined above.

One embodiment of the present invention provides a composition suitable for support in building a three-dimensional object, the composition may include, inter alia, a non-curable component, a curable (meth)acrylic component, wherein the non-curable component is not reactive with the curable component, a surface-active agent, a free radical photo-initiator and a stabilizer, wherein the composition has a first viscosity of about 20-500 cps at a first temperature, wherein the first temperature is ambient temperature, and a second viscosity lower than 20 cps at a second temperature wherein the second temperature is higher than the first temperature, wherein, after irradiation, the composition results in a solid, a semi-solid or a liquid material.

In one embodiment of the present invention, the composition may further include, inter alia, water. In one embodiment of the present invention, the composition further includes a water miscible component that is, after irradiation or curing, capable of dissolving or swelling upon exposure to water, to an alkaline or acidic water solution or to water detergent solution. In another embodiment, the water miscible component is a (meth)acrylated urethane oligomer derivative of polyethylene glycol, a partially (meth)acrylated polyol oligomer, a (meth)acrylated oligomer having hydrophillic substituents, polyethylene glycol mono or di(meth)acrylated, acrylamide, Acryloylmorpholine (ACMO) or any combination thereof. In another embodiment, the hydrophilic substituents are acidic substituents, amino substituents, hydroxy substituents, ionic substituents or any combination thereof.

Non-limiting examples of acrylic components for use in the second interface material according to embodiments of the present invention may be polyethylene glycol mono-acrylate, marketed by Laporte under the trade name Bisomer PEA6, polyethylene glycol diacrylate, marketed by Sartomer under the trade name SR-610, methoxypolyethyleneglycole 550 monomethacrylate, and the like.

In one embodiment of the present invention, the curable component of the second interface material may be a water miscible component that is, after curing, capable of swelling upon exposure to water or to an alkaline or acidic water solution. Non-limiting examples of water miscible components according to embodiments of the present invention are an acrylated urethane oligomer derivative of polyethylene glycol-polyethylene glycol urethane diacrylate, a partially acrylated polyol oligomer, an acrylated oligomer having hydrophillic substituents, or any combination thereof. The hydrophilic substituents are acidic substituents, amino substituents, hydroxy substituents, or any combination thereof. An example of an acrylated monomer with hydrophillic substituents is betha-carboxyethyl acrylate, which contains acidic substituents.

In one embodiment of the present invention, the curable component of the second interface material may also be a molecule having one or more vinyl ether substituents, which may be any of the compounds as defined herein. In one embodiment of the present invention, the concentration of component that includes a molecule having one or more vinyl ether substituents is in the range of 10-30%. In another embodiment, the concentration is 15-20%. In another embodiment, the concentration is 15%. Other concentrations may also be used. An example of vinyl ether for the second interface material is 1,4-cyclohexane dimethanol divinyl ether, marketed by ISP under the trade name CHVE. Other molecules having one or more vinyl ether substituents may be used.

In one embodiment of the present invention, the curable component of the second interface material is an acrylic oligomer. In another embodiment, the curable component of the second interface material is a combination of an acrylic component as defined herein and a water miscible component as defined herein. In another embodiment, the curable component of the present invention is a combination of an acrylic component as defined herein and a molecule having one or more vinyl ether substituents, as defined herein. In another embodiment, the curable component of the present invention is a combination of a water miscible component as defined herein, and a molecule having one or more vinyl ether substituents, as defined herein. Other combinations may also be used.

In one embodiment of the present invention, the composition further includes, inter alia, a sulfur-containing component. In another embodiment, the sulfur containing component is beta mercaptopropionate, mercaptoacetate, alkane thiols or any combination thereof. The sulfur-containing component may be any sulfur-containing component, as defined above.

In one embodiment of the present invention, the non-curable component of the second interface material is a non-curable component. In another embodiment the non-curable component is non-polymerizing component. In another embodiment, the non-curable component is a low toxicity compound. In another embodiment, the non-curable component is a water miscible one. In another embodiment, the non-curable component is a non-water miscible one. In one embodiment of the present invention, the non-curable component is chosen to enhance the water-swelling rate, and to reduce the mechanical strength of the second interface material. High water diffusion rate is desirable in order to minimize the time needed for the water cleaning process of the three-dimensional model. Non-limiting examples of non-curable components according to embodiments of the present invention may be polyethylene glycol marketed by Aldrich under the trade name PEG 400, methoxypolyethylene glycol marketed by Aldrich under the trade name methoxycarbowax 500 and 1000, propylene glycol and paraffin oil. Other examples are ethoxylated polyols and glycerol.

In one embodiment of the present invention, the second interface material is formulated as a liquid. The liquid formulation is a non-curable composition that remains liquid even after radiation exposure. Thus, the liquid formulation includes non-reactive components and does not include reactive components that are capable upon solidifying upon curing. In one embodiment of the present invention, the material may be water miscible, and may easily be washed out with water.

In one embodiment of the present invention, the non-curable component is polyethylene glycol, methoxypolyethylene glycol, glycerol, ethoxylated polyol, propylene glycol or any combination thereof. In another embodiment, the non-curable component is a non-water miscible compound. In another embodiment, the non-water miscible compound is paraffin oil. Other non-curable substances may be used.

One embodiment of the present invention further provides a composition suitable for support in building a three-dimensional object, the composition may include, inter alia, at least one non-curable component, at least one curable component including, inter alia, a molecule having one or more epoxy substituents, wherein the non-curable component is not reactive with the curable component, at least one surface-active agent, at least one cationic photo-initiator and at least one stabilizer, wherein the composition has a first viscosity of about 20-500 cps at a first temperature, wherein the first temperature is ambient temperature, and a second viscosity lower than 20 cps at a second temperature wherein the second temperature is higher than the first temperature, wherein, after irradiation, the composition results in a semi solid material.

In one embodiment of the present invention, the first temperature is a room temperature. In another embodiment, the room temperature is between 20-30° C. In another embodiment, the first temperature is ambient temperature. In another embodiment, ambient temperature is between 10-40° C. In another embodiment, ambient temperature is between 15-35° C. In another embodiment, ambient temperature is between 20-30° C.

In one embodiment of the present invention, the second temperature is higher than 40° C. In another embodiment, the second temperature is higher than 50° C. In another embodiment, the second temperature is higher than 60° C. In another embodiment, the second temperature is higher than 70° C.

Besides swelling, another characteristic of the support upon exposure to water or to an alkaline or acidic water or water detergent solution may be the ability to break down during exposure to water or to an alkaline or acidic water solution. In one embodiment of the present invention, because the second interface material is made of hydrophilic components, during the swelling process, internal forces appear and cause fractures and breakdown of the cured second interface material.

In addition, the second interface material may be at least partially water-soluble. At least part of the second interface material is may be completely water soluble/miscible. During the removal of the support and/or release layers, the water soluble/miscible components are extracted out with water.

In addition, in one embodiment of the present invention, the second interface material liberates bubbles upon exposure to water or to an alkaline water or acidic water solution. The bubbles are intended to help in the process of removal of the support and/or release layers from the construction layers.

In one embodiment of the present invention, the bubbles may be liberated by a bubble releasing substance (BRS) that is present in the water solution that is used to clean out the three-dimensional object. Such a substance may be a carbonate or bicarbonate, for example sodium bicarbonate (SBC). During the swelling process, at least part of the SBC is introduced or absorbed into the second interface material, where it is transformed into carbon dioxide gas ($CO_2$) and a water-soluble salt. The trigger for the production of $CO_2$ may be the reaction of the SBC with an acid functionality present in the second interface material. Such acid functionality may be introduced as part of the second interface material formulation or introduced later, after curing, using an acid water solution. For example, the first step may be to put the three-dimensional object with its support in a water solution containing a SBC, then to place the same object in an acidic solution. The acid will start to decompose the SBC and produces gas (bubbles).

In another embodiment, the substance that liberates gas is already present in the formulation of the second interface material. For example, the second interface material may contain calcium carbonate as a solid filler. In that case, the trigger is the introduction of the second interface material in a water or acidic solution.

It should be clear that a BRS is not limited to a sodium bicarbonate or calcium carbonate and an acidic water solution. Other chemical reagents and reactions may be used to achieve the same result—the production of bubbles inside the matrix of the second interface material. For example, the SBC may be any alkaline metal or alkaline earth metal carbonate or bicarbonate.

In one embodiment of the present invention, the non-curable component is a non-water miscible compound. In another embodiment, the non-water miscible compound is paraffin oil.

In one embodiment of the present invention, the composition further includes, inter alia, a filler. In another embodiment, the filler includes particles having a diameter of less than 1 micron.

In one embodiment of the present invention, the composition further includes a low molecular weight polymer.

In one embodiment of the present invention, the first viscosity composition suitable for support in building a three-dimensional object is about 30-200 cps.

In one embodiment of the present invention, the second viscosity of the composition suitable for support in building a three-dimensional object is lower than 20 cps. In another embodiment, the second viscosity is between 10 and 17 cps. In another embodiment, the second viscosity is between 12 and 16 cps.

Having these viscosities, the first and second interface material may be distinguished from certain prior art formulations designed for ink-jet printing, which may have low viscosity at room temperature, the temperature at which the printing is typically conducted. High viscosity at room temperature may be a desirable property for three-dimensional objects, a feature that may be lacking in the prior art formulations.

In one embodiment of the present invention, the composition further includes, inter alia, a component able to produce gas upon exposure to water or to an alkaline or acidic water solution. In another embodiment, the component is sodium bicarbonate, calcium bicarbonate or a combination thereof. Other suitable substances may be used.

In one embodiment of the present invention, the second interface composition further includes, inter alia, a pigment, a dye or a combination thereof. In another embodiment, the pigment is a white pigment, an organic pigment, an inorganic pigment, a metal pigment or a combination thereof.

Examples of formulations of the second interface material are provided herein in Table 5 and Table 6, to which reference is now made. Tables 5 and 6 display various formulations that are suitable for use as the second interface material. The individual substances, suppliers, combinations, etc., are given by way of example only.

TABLE 5

Examples of Characteristic Formulation Components of Second Interface Material

| # | Trade Name | Chemical Type | Function in the formulation | Supplier |
|---|---|---|---|---|
| A | SR-610 | Polyethylene Glycole (600) Diacrylate | Oligomer | Sartomer |
| B | Bisomer PEA6 | Polyethylene Glycole monoacrylate | Water swelling/ sensitive Oligomer | Laport |
| C | PEG 400 | Polyethylene Glycole 400 | Polymer (hydrophilic and plasticizer) | Aldrich |
| D | Irgacure 907 | alpha-Amino Ketone | Free radical photo-initiator Type I | Ciba Specialties Chemical Inc. |
| E | BP | Benzophenone | Free radical photo-initiator Type II | Satomer |
| F | Triethanol Amine | Ternary Amine | Free radical Coinitiator for Type II photo-initiator | Aldrich |
| G | Byk 307 | Silicone Surface Additive | Surface agent | Byk Chemie |
| H | MEHQ | 4-Methoxy phenol | Inhibitor (thermal stabilizer) | Sigma |
| I | PEG UA | Polyethylene glycol urethane diacrylate | Water swelling/sensitive oligomer | Home made |
| J | AP | Partially acrylated polyol | Water swelling/ sensitive oligomer | Home made |
| K | Betha-CEA | Betha-caboxyethyl acrylate | Acidic monomer | |
| M | CHVE | 1,4-Cyclohexane dimethanol divinyl ether | Vinyl ether monomer | ISP |
| N | Tone polyol 0301 | Caprolactone polyol | Polyol (plasticizer) | Union Cabide |
| O | Paraffin oil | Paraffin oil | plasticizer | Oldrich |
| P | methoxycarbowax 500 and 1000 | methoxypolyethylene glycol | Polymer (hydrophilic and plasticizer) | |
| Q | SR 506 | Isoborny Acrylate | monomer | Cray Valley |

TABLE 6

Examples of Possible Formulation Compositions of Second Interface Material

| Example | A | B | C | D | E | F | G | H | I | J | K | L | M | O | Q | N |
|---|---|---|---|---|---|---|---|---|---|---|---|---|---|---|---|---|
| 1 | X | | X | X | | | X | X | | | | | | | | |
| 2 | X | | X | | X | X | X | X | | | | | | | | |
| 3 | | X | X | X | | | X | X | | | | | | | | |
| 4 | | X | X | | X | X | X | X | | | | | | | | |
| 5 | X | X | X | X | | | X | X | | | | | | | | |
| 6 | X | X | X | | X | X | X | X | | | | | | | | |
| 7 | | | X | | | | X | X | X | | | | | | | |
| 8 | | | X | X | | | X | X | | X | | | | | | |
| 9 | | X | X | X | | | X | X | | | X | | | | | |
| 10 | | | X | X | | | X | X | | | | X | | | | |
| 11 | | | X | X | | | X | X | | | | | | | | |
| 12 | X | | X | | | | X | X | | | | X | X | | | |
| 13 | | X | | X | X | X | X | | X | | | | | | | X |
| 14 | X | X | X | X | X | X | X | | | X | X | | | | | X |
| 15 | | | X | | | | | | | | | X | X | | | |

A formulation of the second interface material is presented in entry No. 3 of Table 6. According to this embodiment of the present invention, the second interface material includes: a water swelling oligomer, which may be any water swelling oligomer as defined herein, and which may be polyethylene glycol; a non-curable component, which may be any non-curable component as defined herein, and which may be polyethylene glycol; a radical photo-initiator, which may be any radical photo-initiator as defined herein, and which may be alpha-amino ketone; a surface agent, which may be a silicone surface additive; and an inhibitor, which may be 4-methoxyphenol.

Another formulation of the second interface material is presented in entry No. 4 of Table 6. According to this embodiment of the present invention, the second interface material includes: a water swelling oligomer, which may be any water swelling oligomer as defined herein, and which may be polyethylene glycole monoacrylate; a non-curable component, which may be any non-curable component as defined herein, and which may be polyethylene glycol; a radical photo-initiator, which may be any radical photo-initiator as defined herein, and which may be benzophenone; a co-initiator, which may be any co-initiator as defined herein, and which may be triethanolamine; a surface agent, which may be a silicone surface additive; and an inhibitor, which may be 4-methoxyphenol.

The first interface material and the second interface material are suitable for use in, for example, the method for three-dimensional printing which is described in U.S. patent application Ser. No. 09/412,618, assigned to the Assignees of the present application and is incorporated herein by reference. Other methods may be used. Briefly, the method according to one embodiment includes: dispensing a first interface material from a printing head; dispensing a second interface material from the printing head; and combining the first interface material and the second interface material in pre-determined proportions to a produce a multiplicity of construction layers for forming the three-dimensional model.

Figure 3:
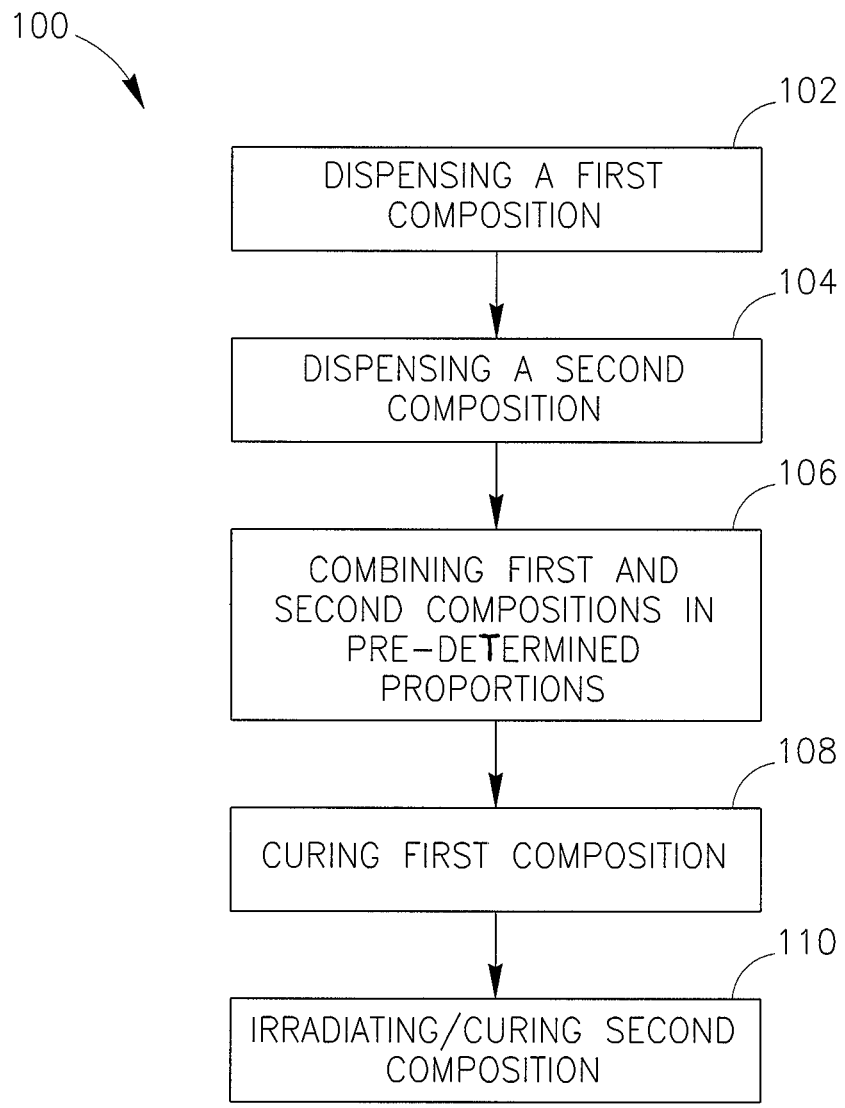
FIG. 3 is a schematic illustration of an embodiment of a method for the preparation of three-dimensional object by three-dimensional printing.

The method (FIG. 3) according to an embodiment of the present invention includes dispensing a first composition suitable for building a three-dimensional object from a dispenser (102), dispensing a second composition suitable for support in building a three-dimensional object from a dispenser (104), combining the first composition and the second composition in pre-determined proportions to produce a multiplicity of construction layers for forming the three-dimensional object (106), curing the first composition resulting in a solid form (108), and irradiating or curing second composition resulting in a liquid, a solid or a semi-solid form (110). Of course, the method may include other steps or series of steps.

One embodiment of the present invention further provides a method for the preparation of a three-dimensional object by three-dimensional printing, the method may include the steps of dispensing a first composition suitable for building a three-dimensional object from a dispenser, the first composition may include, inter alia, a curable component, having a functional group, wherein if the functional group is a polymerizable reactive functional group, then the functional group is a (meth)acrylic functional group, a photo-initiator, a surface-active agent; and a stabilizer, dispensing a second composition suitable for support in building a three-dimensional object from a dispenser, the second composition may include a non-curable component, a curable component, wherein the non-curable component is not reactive with the curable component, a surface-active agent and a stabilizer, combining the first composition and the second composition in pre-determined proportions to produce a multiplicity of construction layers for forming the three-dimensional object, whereby the first composition is cured resulting in a solid form, and whereby the second composition is irradiated or cured resulting in a liquid, a solid or a semi-solid form.

In one embodiment of the present invention, the method may further include the step of generating data for a pre-determined combination of the first composition and the second composition to produce a multiplicity of support layers for supporting the three-dimensional object.

In one embodiment of the present invention, the method may further include the step of generating data for a pre-determined combination of the first composition and the second composition to produce a multiplicity of release layers for releasing the three-dimensional object from the support layers.

In one embodiment of the present invention, the first composition and the second composition are dispensed simultaneously. In another embodiment, the first composition and the second composition are dispensed sequentially. In another embodiment, the first composition is dispensed first. In another embodiment, the second composition is dispensed first. In another embodiment, more than one first composition is used. In another embodiment, the more than one second composition is used.

In accordance with one embodiment of the present invention, the method further includes the step of curing the first interface material. Further, when the second interface material includes a curable component, the method may further include the step of curing the second interface material. Curing may be carried out for example, as described in U.S. patent application Ser. No. 09/412,618. For example, the curing method is by radiation, such as Ultraviolet (UV) and/or Visible (Vis) and/or Infra Red (IR) and/or UV-Vis radiation and/or Electron Beam (EB). In one embodiment of the present invention, the curing method is UV-Vis radiation. Other suitable curing methods may be used.

In operation, in order to obtain layers of different modulus of elasticity and a different strength, the first interface material and the second interface material are combined in pre-determined proportions. For example, in order to obtain layers having a higher modulus of elasticity and a higher strength such as the construction layers, a suitable combination that contains mostly the first interface material may be used. Further, in order to obtain layers having a lower modulus of elasticity and a lower strength such as the release layers, a suitable combination that includes mostly the second interface material may be used.

By way of example, in order to produce the construction layers and/or the support layers, a combination that includes 90-100% of the first interface material and 0-10% of the second interface material may be used. Further, in order to produce the release layers, a combination that includes 0-10% of the first interface material and 90-100% of the second interface material may be used. In another embodiment, in order to produce support layers that have a lower modulus of elasticity and a lower strength than the construction layers, a combination that includes 30-70% of the first interface material and 70-30% of the second interface material may be used.

Thus a three-dimensional object is produced that includes a core consisting of a multiplicity of construction layers. The construction layers are formed by combining predetermined proportions of the first interface material and the second interface material.

One embodiment of the present invention further provides a three-dimensional object comprised of a multiplicity of construction layers, wherein the construction layers are prepared by combining pre-determined proportions of a first composition and a second composition according to the invention. In another embodiment the three-dimensional object is comprised of a core consisting of a multiplicity of construction layers, wherein the construction layers are prepared by combining pre-determined proportions of a first composition and a second composition according to the invention.

One embodiment of the present invention provides a three-dimensional object including the composition according the invention.

In one embodiment of the present invention, the three-dimensional object further includes a multiplicity of support layers for supporting the core. The support layers are prepared by combining pre-determined proportions of the first interface material and the second interface material. The support layers may be designed exactly like to construction layers, or may be designed to be weaker (lower modulus of elasticity) than the construction layers.

In one embodiment of the present invention, the three-dimensional object may further include a multiplicity of support layers for supporting the core, wherein the support layers are prepared by combining pre-determined proportions of the first composition and the second composition. In another embodiment, the support layers support the construction layers. In another embodiment, the support layers have the same strength as the construction layers. In another embodiment, the support layers have the same modulus of elasticity as the construction layers. In another embodiment, the support layers have a lower modulus of elasticity and/or a lower strength than the construction layers.

In one embodiment of the present invention, the three-dimensional object further includes a multiplicity of release layers for releasing the support layers from the construction layers. In one embodiment of the present invention, the release layers are positioned between the support layers and the construction layers. The release layers are prepared by combining pre-determined proportions of the first interface material and the second interface material.

In one embodiment of the present invention, the three-dimensional object may further include a multiplicity of release layers for releasing the support layers from the core, wherein the release layers are positioned between the support layers and the construction layers; wherein the release layers are prepared by combining pre-determined proportions of the first composition and the second composition. In another embodiment, the release layers have a lower modulus of elasticity and/or a lower strength than the construction layers and the support layers.

Deformation of printed objects may occur during or following 3-D object printing. One example of deformation that may occur during the printing process is an inward contraction of the object being printed, due, for example, to accumulative strain on the body of the object during the course of printing. For example, each layer of an object may be deposited during the X movement(s) of the printing head. A layer may generally be continuous, e.g., material may be jetted selectively but continuously from the printing head nozzles during the course of printing in the X direction, to form a continuous layer of material. Typically, a layer is deposited generally in one plane, but in alternate embodiments this need not be the case. In the case of an object being built on a layer upon layer basis, for example, a layer may contract as a result of curing and cause to strain to accumulate within the body of the printed object. The contraction of subsequent layers deposited may add to the strain on the body of the printed object and may result, for example, in the deformation of the object. The accumulative strain may occur, for example, in a radial direction towards the center of the object. In such a case, the external parts of the printed object may be pulled towards the object's center, thus producing object curl (e.g., lifting of the object base edges upwards). Other types of deformations or defections may also occur.

Figure 4A:
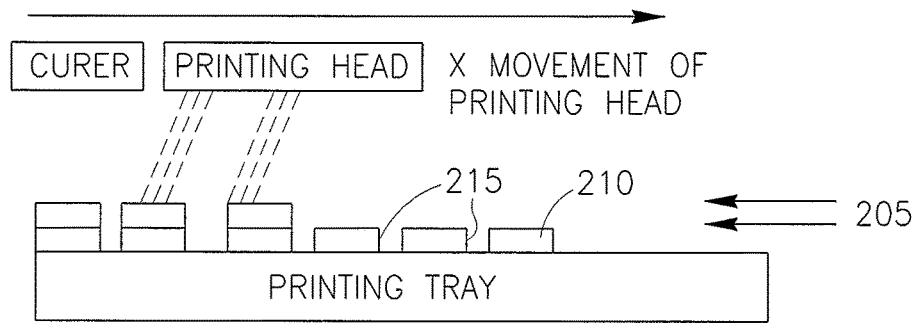
FIG. 4A is a schematic illustration of a printing tray and printing object, according to some embodiments of the present invention.
Figure 4B:
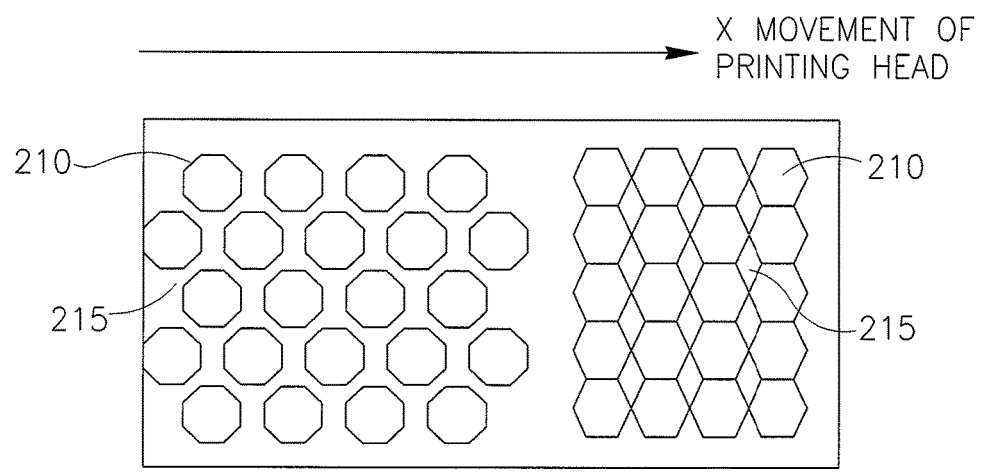
FIG. 4B is a schematic illustration of a printed object, according to an embodiment of the present invention.

Reference is now made to FIGS. 4A and 4B, which are schematic illustrations of object constructions according to some embodiments of the present invention. In FIG. 4A, using what may be referred to as "segmentation", at least part of each layer 205 may be built in non-continuous segments. Such segments may in alternate embodiments be contiguous—for example small portions of segments may touch. Each of the segments 210 that may constitute a layer 205 or part of a layer may be separated by gaps or spaces 215 (such gaps or spaces need not completely separate segments). Segments 210 are typically, deposited generally in one plane, but in alternate embodiments this need not be the case. In the case that segments shrink on curing, segments 210 may shrink separately upon curing, thereby inducing a reduced stress gradient or zero stress gradient towards the center of layer 205. In this way, the accumulative stress that may produce object deformation and/or 'curl' may be eliminated or reduced. According to another embodiment of the present invention, non-continuous layers may be deposited in selected areas that are to be segmented, while continuous layers, for example, may be deposited in areas that may not require segmentation. In other embodiments, non-contiguous or substantially non-contiguous segments may be deposited in systems where no shrinkage occurs.

Two possible examples of segmentation constructions may be seen with reference to FIG. 4B, which is a view from above a printing tray. Other segmentation patterns and methods may be used. Type "A" may include, for example, segments of object construction 210 surrounded in the X and Y directions by spaces, gaps or areas of non-object construction 215. Type "B" may comprise, for example, segments of object constructions 210 that are joined in the Y-direction but separated by spaces or gaps 215 in the X-direction. Other formations or combinations of formations may be used.

Figure 4C:
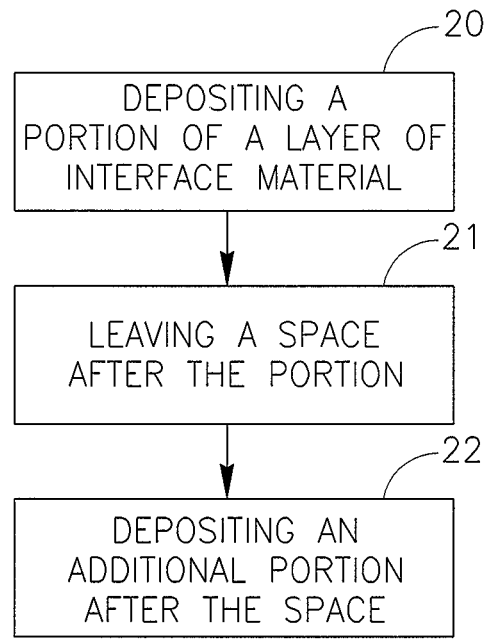
FIGS. 4C-4D are flow chart illustrations of exemplary methods of 3-D printing, according to an embodiment of the present invention.

Reference is now made to FIG. 4C, which is a flowchart illustrating a method for printing of 3-D objects, according to some embodiments of the present invention. As can be seen with reference to FIG. 4C, the method may include, for example, depositing non-continuous layers of interface material. For example, at block 20, a segment or portion of a layer of interface material may be deposited. At block 21 a gap or space may be allocated as a space, and may be left free of deposited material after the previous portion of material was deposited. At block 22 an additional portion of the layer of interface material may be deposited, for example, after the space of the previous deposit of material, thereby forming a non-continuous layer. The portions may be cured after being deposited.

Figure 4D:
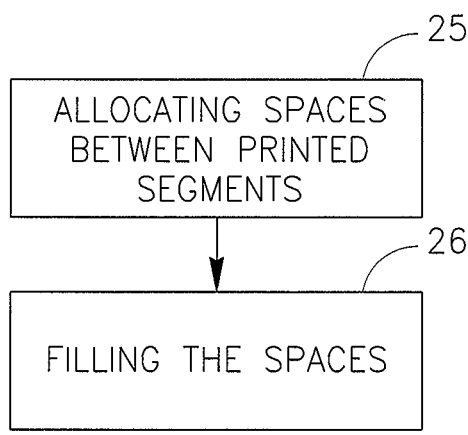

In some embodiments, as can be seen with reference to FIG. 4D, at block 25, when laying and curing of such segmented layers, space may be allocated and left free of deposited material between the segments. At block 26, these spaces, which may be between segments or partially between segments, may be filled and/or otherwise compensated for, in order to create, for example, a continuous layer out of the previously segmented layer. Various suitable methods may be used to fill in spaces between segments. For example, such spaces may be filled in, either simultaneously or subsequently, using substantially the same interface material that may be applied in a subsequent movement of printing head 12. In another example, the spaces may be filled in using substantially the same material, by applying at least one additional layer slightly offset or displaced from the previous layer, so as to be, for example, deposited in between the lines or spaces of the segments laid in previous layers. A further example may be to fill in the spaces using a substantially different type of material, applied in the same and/or subsequent movement of printing head 12. Subsequent layers may be slightly displaced or shifted, for example, in the X and/or Y-directions. Various types and combinations of types of segments, spaces, and fillings may be used. Any combination of the above steps may be implemented. Further, other steps or series of steps may be used.

For example, the material(s) may be jetted non-continuously, for example, in a start/stop/start/stop jetting process, as the printing head moves in the X direction. The printing nozzles may jet material(s) over areas predetermined to be object segments and may cease jetting material over adjacent areas that are predetermined to be spaces. In the areas where material has been jetted by the nozzles, a segment may be created. In the areas where material has not been jetted by the nozzles, a space between segments may be created.

The layers may be cured subsequent to deposition. However, as the curer, e.g., a source of radiation, may follow the path of the printing head, curing may occur in a sweeping motion, curing material just deposited, in the wake of the printing head. That is, the process may be continuous. Other curing methods may be used.

The segmentation method described herein may use various suitable materials to construct the non-continuous layers, segments, spaces, and/or fillings. For example, segmentation may use any of the materials or combinations of materials described herein, for example any first interface material according to the invention, any second interface material according to the invention, any composition suitable for building a three-dimensional object according to the invention, any composition suitable for supporting a three-dimensional object according to the invention, any combination thereof, or any other appropriate material.

According to some embodiments of the present invention, apparatuses, methods, and compositions may be provided to build release layers or constructions to enable easy removal of support constructions following printing of 3-dimensional objects. Release layers may be, for example, relatively soft constructions that may be constructed in relatively thin layers between the 3-D object being built and the support constructions layers supporting the object, to help provide relatively clean and easy removal of the support construction from the 3-D object or removal of certain portions of interface material or objects (cured or otherwise) from other portions or objects, after completion of the printing process. For example, the 'width' of release layers may vary between a few microns (e.g., similar to a construction layer in some embodiments) and a few hundreds of microns (e.g., similar to the width of a few construction layers in some embodiments).

Figure 5A:
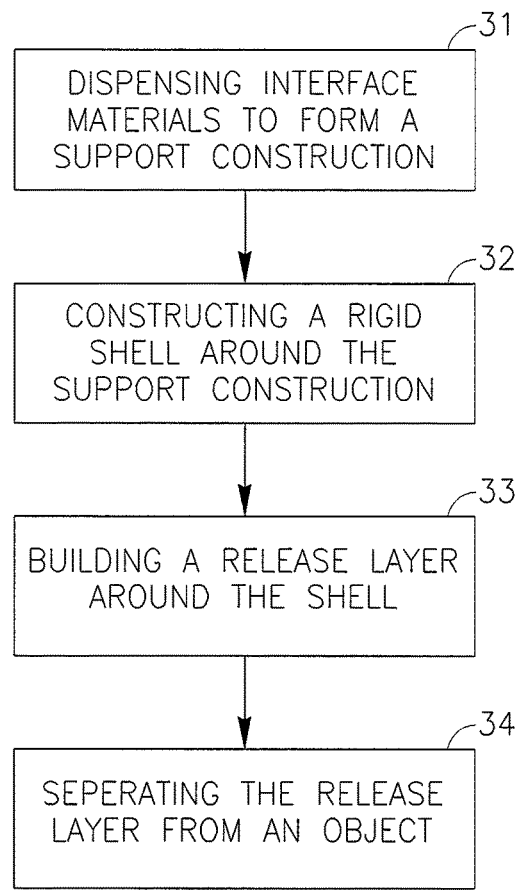
FIG. 5A is a flow chart illustration of exemplary method of printing a support construction for a 3-D object, according to an embodiment of the present invention.

Reference is now made to FIG. 5A, which is a flowchart illustrating a method for printing a support construction for 3-D objects, according to some embodiments of the present invention. As can be seen with reference to FIG. 5A, the method may include, for example, at block 31, dispensing interface materials in predetermined amounts and combinations, from at least one dispensing unit 16 of printing apparatus 15, to form a support construction. Layers of the support construction may include a first interface material (e.g., modeling material), a second interface material (e.g., support material) and/or other materials or combinations of materials. For example, the support construction may be constructed from support material alone, or may include modeling material, possibly providing additional strength and/or elasticity to the support construction.

At block 32, according to some embodiments, the support construction may be surrounded or partially surrounded by a rigid construction, for example, it may be contained within or partially within a rigid shell. The rigid construction may be built, for example, from modeling material, or other suitable material that may be, for example, substantially similar in strength and elasticity to the object. The rigid construction may be built to contain the support construction which itself may contain, for example, elements of modeling material surrounded by support material. In this way a rigid support construction may be formed, which may, for example, provide strong support for a 3-D object.

At block 33, a release construction layer may be constructed around the rigid construction of the support construction, to enable easy separation of the rigid construction from the object which is supported by the rigid construction. The shape of the support construction may be determined according to the shape of the object it supports and therefore the shape of the rigid construction may be the shape of the outer surface of the support construction.

At block 34 the support construction may be separated from the object, for example by slight mechanical force, due to the relatively soft release layer between the rigid object and the rigid support construction. For example, separation may occur due to manual manipulation, using a water, air or other fluid stream, etc.

For example, if the support geometry required is intricate, due, for example, to intricate object geometry, support constructions may be divided into a number of smaller support constructions in order to facilitate their dismantling. Each support construction may be contained within its own rigid support construction.

In a further embodiment, a support construction, which may be, for example, of a gel-like consistency after curing (other consistencies, such as relatively solid, may be used), may be filled with different combinations of support material and modeling material, for example, producing a soft bulk material. In this way, for example, the soft and possibly weak support construction may be strengthened by combining into the support construction a framework or construction comprised of, for example, modeling material, which is harder. In this way the whole 'support construction', which may include support and modeling materials etc., may be relatively firm and yet still soft. This may be referred to as a 'soft bulk material', e.g., which may be a soft material with 'bulk' content. In one embodiment of the present invention the modeling material may be laid as a 'grid' or 'skeleton' within the support material, to provide added strength to the support construction.

In some embodiments, in order to facilitate dismantling of such support constructions from a printed object, a support construction may be designed to be dismantled as a single unit or in a number of units after printing is completed. In one embodiment, a minimal 'space' may be defined or allocated and left free of deposited materials between the 3-D object to be printed and the object's support construction. This space may include, for example, one or more release construction layers, which may consist, for example, predominantly of support material (optionally with a relatively small element of modeling material). In one embodiment, release constructions may not solidify or may solidify partially to provide a relatively soft layer or layers of material that may enable easy release from a printed object. In one embodiment of the present invention, the release construction layers may not solidify upon irradiation and may remain in, for example, a viscous liquid state, i.e., may remain in a non-polymerized state. In another embodiment of the present invention, the release construction layers may solidify or at least partially solidify upon irradiation, for example, having soft or semisolid gel-like consistency. Such 'soft' release construction layers may help to remove the support construction after completion of the printing process. Removal of such support construction, which may include relatively hard layers, may be relatively easy to perform, and may be performed using little or minimal force.

Figure 5B:
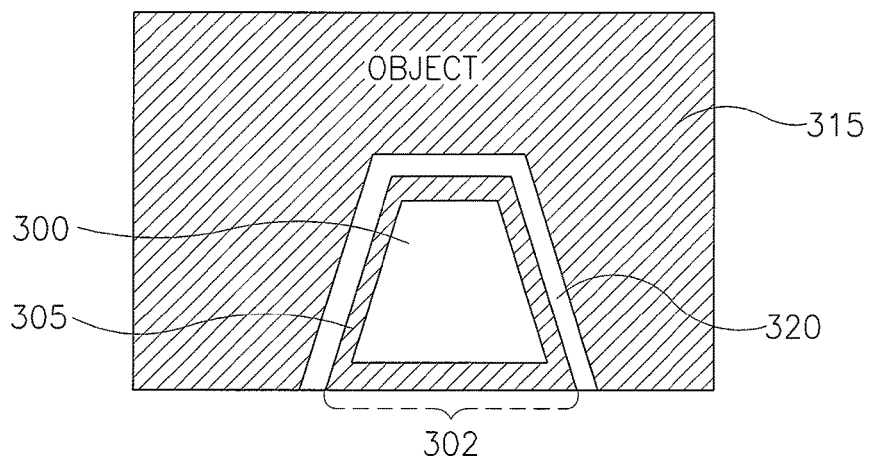
FIG. 5B is a schematic illustration of a support construction with a rigid outer shell, according to an embodiment of the present invention.

Reference is now made to FIG. 5B, which is a schematic illustration of a 3-D object support construction 300 with a rigid exterior construction 305, according to some embodiments of the present invention. As can be seen with reference to FIG. 5A, support material 320 may be surrounded or partially surrounded by a rigid exterior 305. The rigid exterior 305 may be constructed from material that may become rigid upon curing and/or cooling, to form, for example, a shell like exterior. Support material 320 together with rigid exterior 305 may form the 3-D object support construction 300. Support construction 302 may be surrounded or partially surrounded by a relatively soft layer 320, for example, a release layer by, to enable support construction 300 to be easily separated from object 315.

In some embodiments, for example, release construction may be non-planar. For example, release construction material may not necessarily be deposited as a 'layer', and may be deposited in selected locations in the X-Y directions, for example, on top of a previous layer of interface material (e.g., Z direction). The release construction material that may be deposited between the 3-D object (e.g., the modeling construction) and the adjacent support construction(s), may fill the space between the constructions, for example, during each movement of the printing head along the X-Y axes. An example of a conical shaped object (other shapes of objects may be constructed) surrounded by support construction, printed with release construction material as described herein, may be seen with reference to FIG. 5C, which shows a side view of an object 35. The 'release layer' 30 is depicted as a thin line separating the object construction 35 and the support structure 40. FIG. 5D illustrates a view of a 'slice' of the constructed object. Release construction 30 is indicated by a thin line encircling the conical object 35, and separating the object from the surrounding support construction 40. Other release layer dimensions and compositions may be used. Release layers may be used between other sections of interface material, not necessarily designated "object" and "support".

In one embodiment, instructions or indications for, for example, handling, construction, or deconstruction of a finished object may be deposited, constructed or printed directly on the interface material forming, for example, the object, support constructions, release constructions, etc. For example, indicators indicating a preferable removal direction or order, or instructions for removal or deconstruction of support constructions, may be printed or otherwise deposited on support constructions.

System controller 15 may have software or executable code that is programmed with predefined instructions for construction of a 3-D object based on the 3-D data received from a 3-D data source, for example, CAD system 22. Controller may provide, for example, a building plan for an object to be built, which may include, for example, the necessary object construction(s), support construction(s), and/or the release construction(s) between the object and support construction(s). In one embodiment of the present invention controller may enable provision of a set of direction indicators, for example, arrows (e.g., D1, D2, . . . Dn) which may define, for example, the position and direction of placement of the release construction layers, and the 'line' along which the support constructions may be removed after printing. Such indicators may be provided in the controller software, and may appear, for example, as a diagram which may be viewed on a display apparatus 22, for example, a computer screen or other suitable output device. For example, the various direction indicators may be displayed in different colors, or with different symbols. Raised or depressed printing may be used. For example, the set of D1, D2 . . . Dn indicators may enable the printing apparatus to construct the object and support constructions etc. in such a way so as to enable a recommended procedure of extraction of elements of the support construction after printing. In addition, an order of priority of the arrows or other indicators may be set, e.g., the order of priority of the release directions of the structure, which may be determined by the software. Where a number of support structures are required, an optimal order of their removal may be determined by the software or by an operator. In some embodiments structure removal indicators may be visual, for example, they may be constructed from letters, symbols colors, patterns, or other suitable markings. Indicators may be defined in the X, Y and/or Z-directions.

For example, as can be seen with reference to FIG. 5E, one support construction 300 may be beneath an object 315, and one support construction 310 may be penetrating object 315 from the side. Construction 300 may be marked with a direction 325, for example, D1, meaning that it should be removed first, for example, using an arrow showing the direction of preferred removal for this support construction. (e.g., downwards). Construction 310 may be marked with a direction 330, for example, D2, meaning that it should be removed second, with, for example, an arrow at about a 45-degree angle downwards, indicating the direction of its preferred removal. The angle of removal of D2 indicates the line along which the support may efficiently be removed, and may dictate the angle of the break' between two adjacent supports, to help facilitate removal of each support structure. Between object 315 and support constructions 300 and 310, and between the support constructions 300 and 315 support material 320 (e.g., soft material) may be dispensed, for example, a release construction layer. Other suitable marking systems may be used, and the objects shown are for example only—other objects may be built, having other support or other auxiliary constructions.

As can be seen with reference to FIG. 5F, at block 36 an order or priority of the indicators may be defined, for example, according to the preferred order of removal of the support construction(s). In one embodiment of the present invention, the controller software may, for example, calculate and define the direction indicators and/or order of removal of the support construction(s). In the above embodiments and other suitable embodiments, the software may define, for example, the release construction layers in such a way that each construction may be removed substantially without interfering with or otherwise disturbing the removal of other support structures, due, for example, to the removal of such construction(s) in a pre-determined order of priority. Other removal indicating mechanisms may be used. At block 37 release layers may be constructed with removal indicators.

Figure 5G:
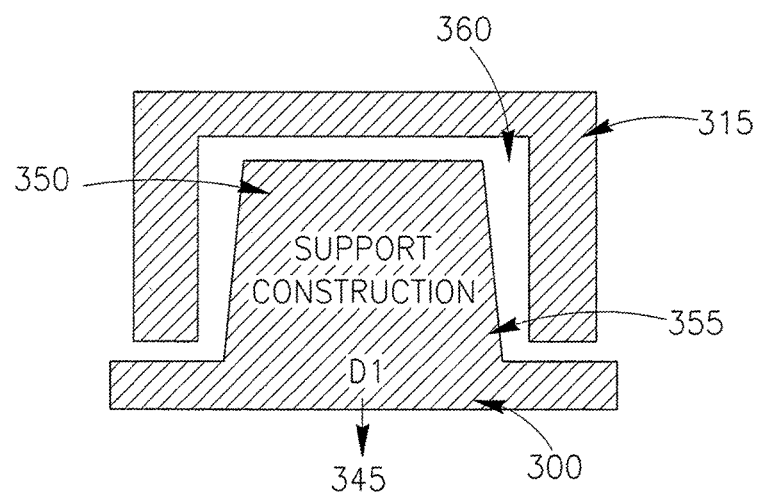
FIG. 5G is a schematic illustration of a support construction with tapered edges, according to an embodiment of the present invention.

According to an embodiment of the present invention, a support construction 340 may be predefined to have, for example, a tapered shape in respect of the direction of preferred removal. For example, as can be seen with reference to FIG. 5G, the inner portion of the support construction 350 (e.g., closer to the 3-D object) may be narrower than the outer portion 355 of support construction 300. A soft layer 360, for example, a release layer, may be constructed between support construction 300 and object 315.

Figure 5H:
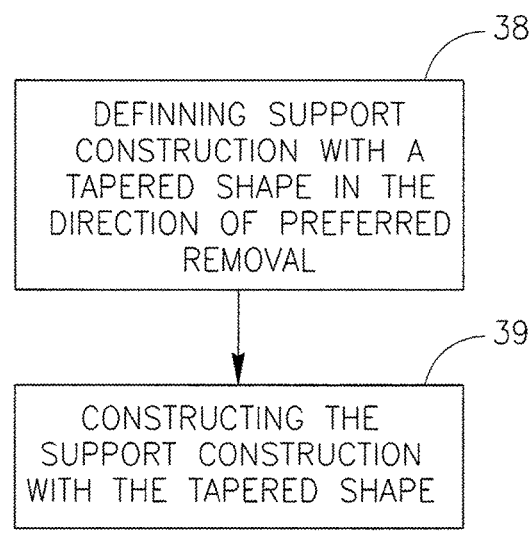
FIG. 5H is a flow chart illustration of a method of 3-D printing using a support construction with tapered edges, according to an embodiment of the present invention.

As can be seen with reference to FIG. 5H, at block 38 a support construction may be predefined to have, for example, a tapered shape in respect to the direction of preferred removal. At block 39 a support construction with an appropriate tapered shape may be constructed. In another example, the outer side or edge of the support structure may be predefined to include features, for example holes and/or protrusions etc., which may assist, for example, in identifying the construction as a support construction which is to be removed after printing. Other mechanisms for enabling simplified removal of support constructions from object constructions may be used. Any combination of the above steps may be implemented. Further, other steps or series of steps may be used.

The release layers or constructions as described herein may use various suitable materials, such as the materials described herein, for example any combinations of pre-determined proportions of the first interface material and a second interface material according to the invention. Of course other materials and compositions may be applied.

According to some embodiments of the present invention, apparatuses, methods, and compositions may be provided to, for example, build 3-dimensional molds for use in, for example, investment casting. Generally in investment casting, a mold may be built and subsequently immersed and cast in a heat-resistant substance, for example, ceramic, or such like, which may harden around the mold to form a cast. The thus-formed cast may be placed in an oven and heated. In most cases, the heating process may increase the solidification of the cast material. When heating, the original mold may melt or otherwise liquefy and drain away, leaving only the cast, which may then be used for investment casting.

Figure 6A:
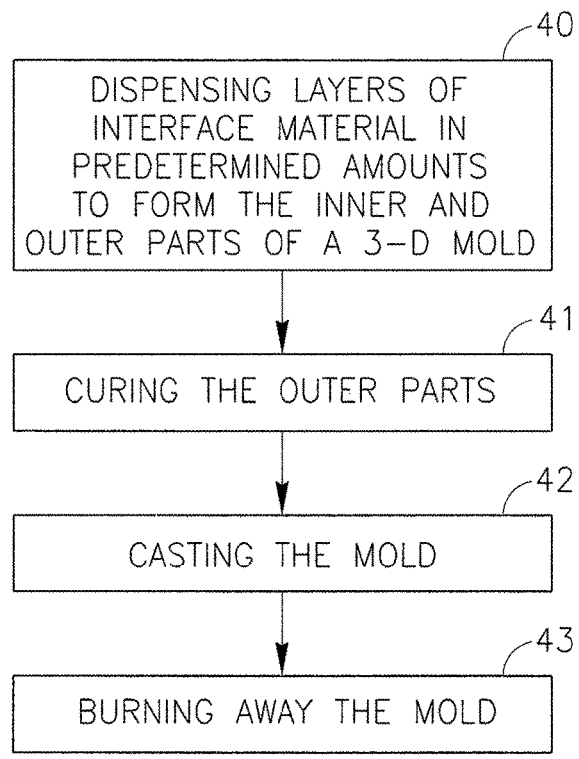
FIG. 6A is a flow chart illustration of an exemplary method of 3-D printing, according to an embodiment of the present invention.

Reference is now made to FIG. 6A, which is a flowchart illustrating a method for printing a 3-D prototype mold, according to some embodiments of the present invention. As can be seen with reference to FIG. 6A, the method may include, for example, at block 40, dispensing layers of interface material in predetermined amounts from one or more printing heads 12 of printing apparatus 15, for example as is described in U.S. Pat. No. 6,259,962, which is assigned to the current assignee, and is incorporated herein by reference. The various combinations of interface materials used to form the inner and outer parts of such a 3-D mold, and their relative amounts, order, and place of dispensing, may be determined by, for example, converting a STL file or any suitable graphic or 3-D build or design file for this purpose by system controller 20 via, for example, CAD system 22.

For example, the wall thickness of the shell may range, for example, between 0.5 mm to 0.9 mm, or may be of any other suitable measurements, depending on the size and shape of the object to be cast. At block 41 the shell may harden upon curing, for example, to form a solid 'shell' around the non-solid support material filling. At block 42 the mold may be cast, for example, in a ceramic or any other suitable heat-resistant substance, by placing the cast in a heat source, for example, an oven, and heating the cast. At block 43 the prototype 3-D mold built by printing system 10 may be burnt and may, for example, dissipate in the oven, leaving only the cast which may subsequently be used for investment casting. The prototype material may be burnt out at a high temperature, which may be, for example, in the range of 1000-1800° F. or any other suitable temperature range. In the case where the mold includes a relatively thin outer wall with a filling of semi-solid support materials, the mold may be easily burnt away, without swelling, thereby minimizing the risk of causing a break in the cast, and substantially without leaving traces of the prototype material inside the cast. Any combination of the above steps may be implemented. Further, other steps or series of steps may be used.

Figure 6B:
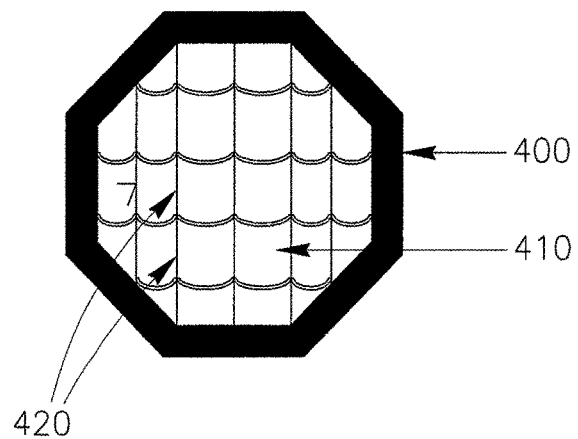
FIG. 6B is a schematic illustration of a support construction with a rigid outer shell and a rigid internal grid, according to an embodiment of the present invention.

As can be seen with reference to FIG. 6B, according to some embodiments of the present invention, a solid outer shell 400 of such a mold may be comprised, for example, predominantly of a first interface material (e.g., modeling material layers). The interior of such a 3-D object shell may be comprised predominantly of a second interface material 410 (e.g., support construction layers). Such support layers may be, for example, strengthened by constructing a grid 420 of the first interface material within the support construction layer. Embodiments of such grid may substantially be executed as described in U.S. patent application Ser. No. 10/101,089, assigned to the current assignee and incorporated herein by reference, and the description provided herein.

The outer shell and interior elements of printed molds as described herein may use various suitable materials, such as the materials described herein, for example any combinations of pre-determined proportions of the first interface material and a second interface material according to the invention. Of course other materials and compositions may be applied.

Pseudo Composite Material, Method and Apparatus

One embodiment of the present invention provides a new type of material, which may be termed "pseudo composite material" (PCM), having a multi-phase structure and pre-designed isotropic or un-isotropic properties, such as mechanical, thermo-mechanical, acoustical, optical, electrical and/or other properties. In one embodiment of the invention, PCMs may include, inter alia, multi organic macroscopic phase structure. In another embodiment, PCM is a new type of non-homogeneous material. In another embodiment, PCM is a material whose structure and novel properties are dictated by the compositions composing it and by the specific combination of compositions and/or composition construction arrangement employed at any given time. As a matter of comparison, conventional composite materials are usually organic polymer materials (organic continuous phase) reinforced by inorganic materials (non-continuous phase), in the form of fibers, particles, or other inorganic materials. Organic reinforcement materials are not very common.

In one embodiment of the present invention, the PCM may have specially designed isotropic properties. In another embodiment of the present invention, the PCM may have specially designed non-isotropic properties. PCMs may vary in property between isotropic and non-isotropic properties. In one embodiment of the present invention, PCMs may consist of photopolymers, thermocurable compositions, two-component type reaction compositions, phase change, or any combination thereof. In another embodiment, PCMs may include any composition according to the invention. In one embodiment of the present invention, PCMs may include, inter alia, materials having different mechanical and/or optical and/or acoustic and/or other properties. In one embodiment of the present invention, PCMs may include, inter alia, materials combined in a number of different combinations. In one embodiment of the present invention, the combination of different materials having different properties would be determined according to the type of PCM desired, e.g., a high tensile strength and a high impact resistance. Of course, other types of PCMs having other properties may be obtained.

In one embodiment of the present invention, the terms "multi", "multiple" or "multiplicity" refer to a number greater than one.

In one embodiment of the present invention, the term "phase" as referred to throughout the invention may be a material. In another embodiment, the term phase as referred to throughout the invention may be a determined sector/region. In another embodiment, the phase may be homogeneous. In another embodiment, the phase may be homogeneous in structure, composition, properties or any combination thereof. In another embodiment, at least one phase of the PCM is different from at least one other phase of the PCM. In another embodiment, different is different in structure, composition, properties or any combination thereof.

In one embodiment of the present invention, the term "photopolymer" as referred to throughout the invention may be a composition comprising components able to be polymerized upon exposure to electron beam, electromagnetic radiation, or both, or may be the polymer resulting from such polymerization.

In one embodiment of the present invention, the term "thermocurable" as referred to throughout the invention may be a composition comprising components whose rate of polymerization is affected by temperature and time. A rise in temperature typically enhances the rate of polymerization.

In one embodiment of the present invention, the term "two-component type reaction composition" as referred to throughout the invention may be a polymerization reaction that requires the participation of at least two different chemical functional groups. A non-limiting example of such reaction may be the condensation reaction.

In one embodiment of the present invention, the term "phase change" as referred to throughout the invention may be a the solidification of a particular composition upon reduction of temperature. A non-limiting example may be the crystallization process of a wax.

In one embodiment of the present invention, a non-homogeneous material is a material that includes at least two phases.

In one embodiment, the present invention provides a pseudo composite material, including, inter alia, a first phase and a second phase, wherein each phase may include, inter alia, an organic compound, wherein each phase may include a multiplicity of construction layers, wherein the layers were deposited by ink-jet printing, wherein the pseudo composite material exhibits non-homogeneous three-dimensional structure.

In another embodiment, the pseudo composite material may further include, inter alia, one or more phases, wherein each phase may include a multiplicity of construction layers.

In one embodiment, the present invention provides a three-dimensional object including, inter alia, a pseudo composite material, wherein the pseudo composite material may include, inter alia, a first phase and a second phase, wherein each phase may include, inter alia, an organic compound, wherein each phase may include a multiplicity of construction layers, wherein the layers were deposited by ink-jet printing, wherein the pseudo composite material exhibits non-homogeneous three-dimensional structure.

In another embodiment, the three-dimensional object may further include, inter alia, one or more phases, wherein each phase may include a multiplicity of construction layers.

In another embodiment, the three-dimensional object may further include, inter alia, one or more phases, wherein each phase may include a multiplicity of construction layers.

In another embodiment, the three-dimensional object may further include, inter alia, a multiplicity of support layers for supporting the construction layers of the three-dimensional object. In another embodiment, the support layers are any support layers according to the invention.

In another embodiment, the three-dimensional object may further include, inter alia, a multiplicity of release layers for releasing the support layers, wherein the release layers are positioned between the support layers and the construction layers. In another embodiment, the release layers are any release layers according to the invention.

In another embodiment, the non-homogeneous three-dimensional structure may include, inter alia, sectors/regions of a first phase and sectors/regions of a second phase.

In one embodiment of the present invention, the first phase is structurally different from the second phase. In another embodiment, the first phase is chemically different from the second phase. In another embodiment, the first phase exhibits different properties from the second phase.

In one embodiment of the present invention, the first phase may be produced by dispensing a first phase composition and the second phase may be produced by dispensing a second phase composition.

In one embodiment of the present invention, the term "phase composition" as referred to throughout the invention may be any material or combination of materials that are liquid at the deposition temperature and may be dispensed by an ink-jet printing apparatus to form a construction layer. In another embodiment of the present invention, the phase composition may include, inter alia, any interface material according to the invention. In one embodiment of the present invention, any phase according to the invention may be produced by dispensing a phase composition.

In another embodiment, the curable component may be, for example, electron beam (EB) curable. In another embodiment, the curable component may be electromagnetic radiation curable. In another embodiment, the electromagnetic radiation curable component may be ultra violet (UV) curable. In another embodiment, the electromagnetic radiation curable component may be visible (Vis) curable. In another embodiment, the electromagnetic radiation curable component may be infra red (IR) curable. In another embodiment, the curable component may be thermo-curable. Other types of curable components may be used. In another embodiment, the composition may be two component type reaction compositions. In another embodiment, the composition may be phase change. In another embodiment, the composition may be any combination of the above mentioned components.

In one embodiment of the present invention, the first phase composition, the second phase composition or both may include, inter alia, a curable component. In another embodiment, the curable component may be electron beam curable, electromagnetic radiation curable, thermo-curable or any combination thereof.

In one embodiment of the present invention, the first phase composition, the second phase composition or both may include, inter alia, a first interface material, wherein the first phase composition and the second phase composition are not identical. In another embodiment, the first interface material is any first interface material according to the invention.

In one embodiment of the present invention, the first phase composition, the second phase composition or both may include, inter alia, a first interface material and a second interface material in a pre-determined proportions, wherein the first phase composition and the second phase composition are not identical. In another embodiment, the first and/or second interface materials are any first and/or second interface material according to the invention.

In one embodiment of the present invention, the first phase composition, the second phase composition or both may include, inter alia, any composition suitable for building a three-dimensional object according to the invention. In another embodiment, the first phase composition, the second phase composition or both may include, inter alia, any composition suitable for support in building a three-dimensional object according to the invention.

In one embodiment of the present invention, the phase composition may include, inter alia, a curable component. In another embodiment, the phase composition may include, inter alia, a first interface material. In another embodiment, the first interface material is any first interface material according to the invention. In another embodiment, the phase composition may include, inter alia, a first interface material and a second interface material in a pre-determined proportions. In another embodiment, the first and/or second interface materials are any first and/or second interface material according to the invention. In another embodiment, the phase composition may include, inter alia, any composition suitable for building a three-dimensional object according to the invention. In another embodiment, the phase composition may further include, inter alia, any composition suitable for supporting a three-dimensional object according to the invention.

In one embodiment of the present invention, at least one phase of the pseudo composite material may be a continuous phase. In another embodiment, at least one phase may be a non-continuous phase.

In one embodiment of the present invention, the properties of the pseudo composite material may be, inter alia, isotropic properties, un-isotropic properties or a combination thereof. In another embodiment, the properties may be, inter alia, mechanical, thermo-mechanical, optical, acoustic, electrical properties or any combination thereof.

In another embodiment, the mechanical strength of the pseudo composite material along one axis of the material may be higher than the mechanical strength of the material along another axis of the material.

In another embodiment, the elasticity of the pseudo composite material along one axis of the material may be higher than the elasticity of the material along another axis of the material.

In another embodiment, the refractive index of the pseudo composite material along one axis of the material may be different than the refractive index of the material along another axis of the material. In another embodiment, the refractive index of the material along one axis may vary.

In one embodiment of the present invention, the PCM may include, inter alia, at least two photopolymers. In another embodiment, the PCM may consist of multiple materials. In another embodiment the materials may have multiple properties and/or multiple colors, and may have specially designed un-isotropic mechanical and/or optical and/or acoustic and/or other properties as well as improved thermo-mechanical properties. In another embodiment, the PCM may have gradient properties.

As aforesaid, PCM structure is pre-designed and may vary according to its intended use, varying between isotropic and non-isotropic, according to the structure and the type of materials comprising it. The following non-limiting examples are provided: a PCM may be rigid in one bending axis and flexible in another, a PCM may possess rare combinations of properties such as high impact strength and high Heat deflection temperature (HDT), a PCM may have "gradient" properties, i.e., a single piece of material may for example be flexible on one side or extreme and rigid on another side and between these two sides or extremes, the flexible material gradually and smoothly becomes less flexible and more rigid until it has become rigid, showing the existence of a gradient in properties such as strength, modulus and/or elasticity from one side of the object to the other. The gradient properties are not limited to mechanical properties. Other gradient properties, e.g., optical, acoustical and electrical properties are also contemplated by this invention.

In another embodiment, the PCM structure is pre-designed according to the intended use of the PCM. In another embodiment, the mechanical properties include, inter alia, impact strength, elasticity, strength, modulus, etc. In another embodiment, the thermo-mechanical properties include, inter alia, Heat Deflection Temperature, coefficient of thermal expansion, etc. In another embodiment, the acoustical properties include, inter alia, Absorbance, reflection, transmission of sound waves, internal energy dissipation (damping) etc. In another embodiment, the optical properties include, inter alia, refractive index, attenuation, light absorption, light scatter. In another embodiment, the electrical properties include, inter alia, dielectric constant, conductivity, etc.

In one embodiment of the present invention, the acoustic properties may include, inter alia, absorption and transmission. In another embodiment, absorption is the amount of sound that a material can "soak-up" (i.e., the sound energy dissipating into heat energy through viscous friction). In another embodiment, porous materials such as open-cell foam may be used as absorbers. In another embodiment, transmission describes the amount of sound that passes through a material. Non-transmissive materials are needed to contain sound within a space, or isolate one space from another, such as between a studio and control room. In another embodiment, heavy, solid, limp, airtight materials may be used for preventing sound transmission.

In one embodiment of the present invention, the optical properties may include, inter alia, refractive index, attenuation and absorption. In another embodiment, refractive index indicates the extent to which a light beam is deflected when passing from vacuum into a given substance. In another embodiment, attenuation of the radiant flux occurs when light is passed through a clear medium. If light of suitable wavelength is passed through a sample, part of the energy is transmitted to the molecules sample. As a result, the emergent beam has less energy than the incident beam. In another embodiment, the amount of light absorbed generally follows the Lambert-Beer Law and is therefore proportional to the number of absorbing molecules and the path length traversed. In another embodiment, if the medium contains turbidity, additional attenuation is caused as a result of light scattering.

In one embodiment of the present invention, the mechanical properties may include, inter alia, those properties of a material that are associated with elastic and inelastic reaction when force is applied, or that involve the relationship between stress and strain; for example, modulus of elasticity, tensile strength, endurance limit.

In one embodiment of the invention, the term macroscopic phase structure refers to phases composing the PCM which are present in agglomerates the physical dimensions of which are macroscopic. In another embodiment, the dimensions of the agglomerates are higher than 100 micron in at least one of it is axis diameter. In another embodiment, the agglomerates are at least as large as the volume of one droplet. In another embodiment, the agglomerates are around 80 nano-gram.

PCM Structure

In one embodiment of the invention, the PCM phase structure refers to the specific combination between the different phases which compose it.

In one embodiment of the invention, the PMC phase structure refers to the specific three-dimensional structure formed by the solidification and/or curing of the multiplicity of construction layers, wherein the construction layers are made of the different phase compositions, used to build the PCM.

In one embodiment of the present invention, the combination of two or more different compositions with different properties would be determined according to the type of PCM desired to be obtained from the compositions, for example, a strong, solid material with flexibility. Of course, other types of PCMs having other properties may be obtained.

According to embodiments of the present invention multiple, different compositions are combined in different ways in order to obtain a single material with desired properties. In another embodiment, the properties are varying along a desired axis. The resulting material is a PCM.

In one embodiment of the present invention, a PCM may include combinations designed for use in building model construction layers. In another embodiment, a PCM may include combinations designed for use in building support construction layers. In another embodiment, a PCM may include combinations designed to build release construction layers. In another embodiment, a PCM may include first interface material according to the invention. In another embodiment, a PCM may include second interface material according to the invention.

In one embodiment of the present invention, a PCM may be designed to produce a bulk material with pre-designed properties, such as herein described.

Figure 7:
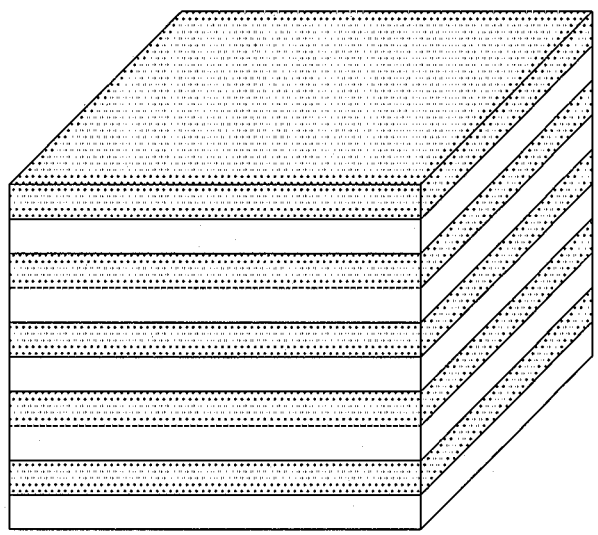
FIG. 7 is a schematic illustration of a PCM of alternating XY-plane layers according to one embodiment of the present invention: one layer is made of one photopolymer combination, (A and C combination), and the other layer is made of another photopolymer combination (B and C combination)
Figure 8:
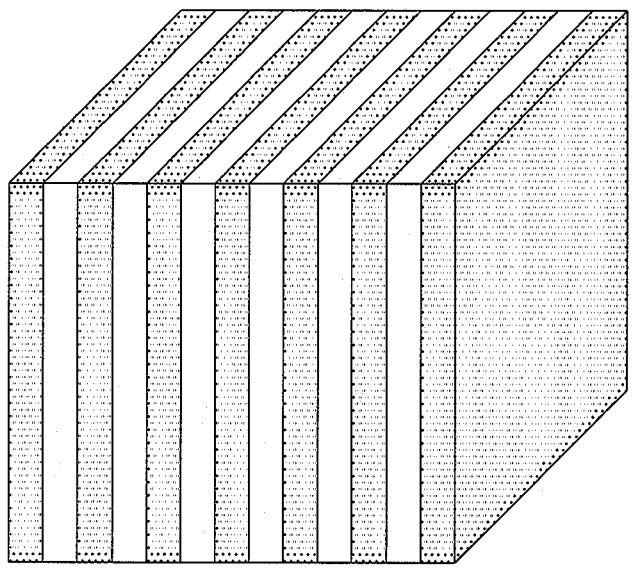
FIG. 8 is a schematic illustration of a PCM of alternating XZ-plane layers according to one embodiment of the present invention: each model construction layer is made of a sequential combination of photopolymer compositions (A and B)
Figure 8:
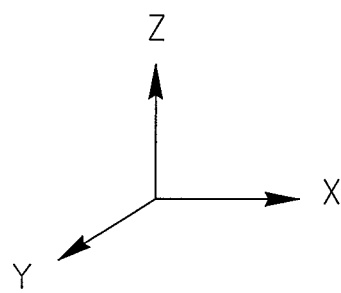
Figure 9:
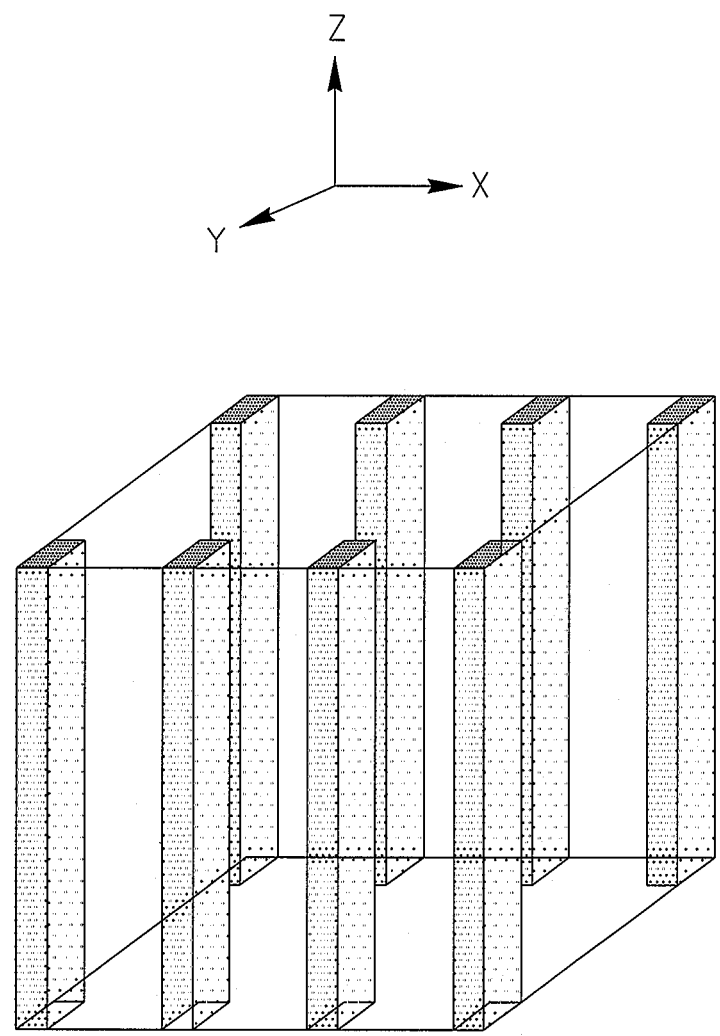
FIG. 9 is a schematic illustration of a PCM of an elastomeric continuous phase model with high strength photopolymer reinforcement: the high strength photopolymer (non continuous phase, B) is constructed in the form of columns, surrounded by an elastomeric photopolymer (continuous phase, A), according to one embodiment of the present invention.
Figure 10:
FIG. 10 is a schematic illustration of a non-elastomeric continuous phase model: the elastomeric photopolymer may be built as tiny elastic areas (e.g., continuous phase, A), surrounded by non-elastic photopolymer (e.g., non-continuous phase, B), according to one embodiment of the present invention.
Figure 10:
Figure 10:
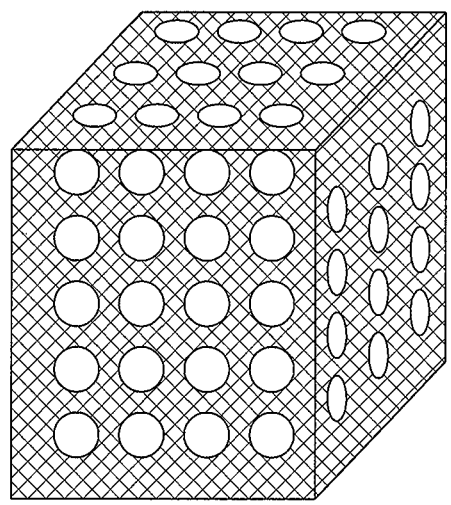
Figure 10:
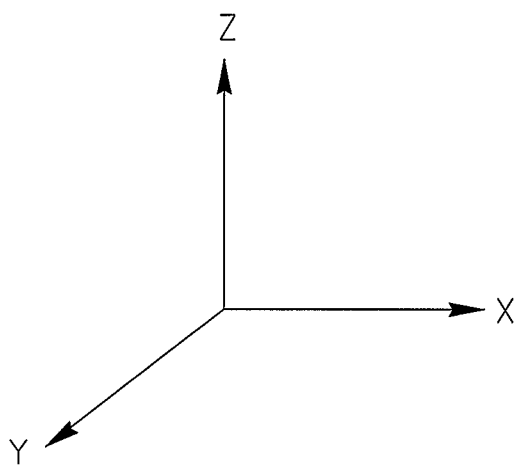

Non-limiting examples of PCMs comprised of three compositions (A, B, C) which are model-construction layer structures are provided herein:

1. A PCM of alternating XY-plane layers: one layer is made of one photopolymer combination, (e.g., an A and C combination), and the other layer is made of another photopolymer combination (e.g., a B and C combination) (FIG. 7).
2. A PCM of alternating XZ-plane layers: each model construction layer is made of a sequential combination of photopolymer compositions (e.g., A and B) (FIG. 8).
3. A PCM of an elastomeric continuous phase model with high strength photopolymer reinforcement: the high strength photopolymer (for example, a B non continuous phase) is constructed in the form of columns, surrounded by an elastomeric photopolymer (for example, an A continuous phase) (FIG. 9).
4. A PCM of a non-elastomeric continuous phase model: the elastomeric photopolymer is built as tiny elastic areas (for example using A continuous phase), surrounded by non-elastic photopolymer (for example, B non continuous phase) (FIG. 10).

The above-mentioned examples are only few types of possible PCM combinations. Of course, other combinations and examples may be used.

In one embodiment of the present invention, a PCM may combine outstanding high-impact strength and relatively high HDT (heat distortion temperature).

In one embodiment of the present invention, the materials and methods of the invention are implemented to build a three-dimensional object with a very low curl distortion.

In one embodiment of the present invention, the model construction layers are made of non-continuous segments of a first composition (for example, photopolymer A), where the gaps between the segments are filled with the same composition type, after at least partial curing of the non-continuous segments.

In one embodiment of the present invention, the model construction layers are made of non-continuous segments of a first composition (for example, photopolymer A), where the gaps between the segments are filled with a second composition, for example photopolymer B, where photopolymer B is an elastomeric-type material, able to dissipate the stress caused by photopolymer A and B shrinkage.

In another embodiment of the present invention, a non-limiting example of composition A is a photopolymer elastomer composition including SR 9036 (27%), Cl 1039 (28%), CN131 (15%), SR 506 (22%), Ph 3015 (7%) and I-819 (1%).

In another embodiment of the present invention, a non-limiting example of composition C is any support composition according to table 6.

In another embodiment of the present invention, a non-limiting example of composition B is a rigid model, as disclosed in Tables 3 and 4.

The Apparatus

One embodiment of the present invention provides a printer for producing bulk PCM. Another embodiment of the present invention provides a printer for producing a complete three-dimensional object.

In one embodiment of the present invention, a rapid prototyping (RP) apparatus for selective deposition of materials may be employed, comprising at least 3 sets of material dispensers (preferably, at least 3 sets of ink-jet printing heads), is used to build a three dimensional object. Each set of material dispensers and/or ink-jet printing heads may comprise one or more dispensers and/or ink-jet printing heads. In one embodiment of the present invention, each set of material dispensers and/or ink-jet printing heads dispenses a different composition. Other numbers of printing heads and materials may be used.

For example, for descriptive purposes only, 3 sets of ink-jet printing heads may jet or dispense 3 type of materials, denoted herein as compositions A, B, and C, respectively, where "A" develops type A properties, "B" develops type B properties and "C" develops type C properties. For example, "A" after curing may develop elastomeric type properties, "B" after curing may develop high strength non-elastomeric type properties and "C" after curing may develop only very weak mechanical strength properties, such as described herein as the "second interface material". Of course, other compositions may also be applied.

In one embodiment of the present invention, certain compositions of A, B and C may be used to build model construction layers, other compositions of A, B and C may be used to build support construction layers and yet other compositions of A, B and C may be used to build release construction layers.

In another embodiment of the present invention, compositions A and B may be used to build model construction layers, compositions B and C may be used to build support construction layers and composition C may be used to build release construction layers.

In one embodiment, the present invention provides a printer for printing a pseudo composite material, including, inter alia a controller to enable producing a first phase and a second phase, wherein the first phase and the second phase may include, inter alia, an organic compound, thereby producing a pseudo composite material having a non-homogeneous three-dimensional structure. In another embodiment, the apparatus may further include at least two dispensers. In another embodiment, the apparatus may further include at least three dispensers. In another embodiment, different phase combinations may be used. In another embodiment, the apparatus may be used, inter alia, for the preparation of a three-dimensional object.

Methods

According to one embodiment of the present invention, the methods described permit the production of PCM for further processing (such as bulk engineering materials). According to another embodiment, the methods of the present invention enable the production of a complete three-dimensional object.

According to embodiments of the present invention, a specific PCM structure comprised of different and multiple, pre-selected compositions is designed. According to the thus designed PCM structure, a number of one or two or more different types of compositions are selectively dispensed to form a layer.

In one embodiment, the present invention provides a method for the preparation of a pseudo composite material having a non-homogeneous three-dimensional structure, the method may include, inter alia, the steps of dispensing a first phase composition from a first dispenser to produce a first phase, wherein the first phase may include, inter alia, an organic compound, dispensing a second phase composition from a second dispenser to produce a second phase, wherein the second phase may include, inter alia, an organic compound, whereby depositing a multiplicity of construction layers, curing or solidifying the first phase composition and the second phase composition, thereby producing a pseudo composite material having a non-homogeneous three-dimensional structure.

In another embodiment, the method for the preparation of a pseudo composite material having a non-homogeneous three-dimensional structure, may further include, inter alia, the step of producing one or more phases, wherein each phase comprising a multiplicity of construction layers.

In another embodiment of the present invention, the method for the preparation of a pseudo composite material having a non-homogeneous three-dimensional structure may be used, inter alia, for the preparation of a three-dimensional object.

In one embodiment, the present invention provides a method for the preparation of a three-dimensional object, the method may include, inter alia, the preparation of a pseudo composite material having a non-homogeneous three-dimensional structure, the method may include, inter alia, the steps of dispensing a first phase composition from a first dispenser to produce a first phase, wherein the first phase may include, inter alia, an organic compound, dispensing a second phase composition from a second dispenser to produce a second phase, wherein the second phase may include, inter alia, an organic compound, whereby depositing a multiplicity of construction layers, curing or solidifying the first phase composition and the second phase composition, thereby producing a pseudo composite material having a non-homogeneous three-dimensional structure, thereby producing a three-dimensional object.

In another embodiment, the method for the preparation of a three-dimensional object, may further include, inter alia, the step of producing one or more phases, wherein each phase comprising a multiplicity of construction layers. In another embodiment, the method for the preparation of a three-dimensional object, may further include, inter alia, the step of producing a multiplicity of support layers for supporting the construction layers of the three-dimensional object. In another embodiment, the method for the preparation of a three-dimensional object, may further include, inter alia, the step of producing a multiplicity of release layers for releasing the support layers, wherein the release layers are positioned between the support layers and the construction layers.

In one embodiment of the present invention, at least one construction layer may include, inter alia, the first phase composition and the second phase composition.

In one embodiment of the present invention, curing or solidifying are performed immediately after deposition of one construction layer. In another embodiment, curing or solidifying are performed after deposition of more than of one construction layers. In another embodiment, curing or solidifying are performed during deposition of the construction layers. In another embodiment, curing is performed at a controlled temperature. In another embodiment, the temperature is higher than 25° C.

In one embodiment of the present invention, the first phase is structurally different from the second phase. In another embodiment, the first phase is chemically different from the second phase. In another embodiment, the first phase exhibits different properties from the second phase.

In one embodiment of the present invention, the first phase composition, the second phase composition or both may include, inter alia, a curable component. In another embodiment, the curable component may be electron beam curable, electromagnetic radiation curable, thermo-curable or any combination thereof.

In one embodiment of the present invention, the first phase composition, the second phase composition or both may include, inter alia, a first interface material, wherein the first phase composition and the second phase composition are not identical. In another embodiment, the first interface material is any first interface material according to the invention.

In one embodiment of the present invention, the first phase composition, the second phase composition or both may include, inter alia, a first interface material and a second interface material in a pre-determined proportions, wherein the first phase composition and the second phase composition are not identical. In another embodiment, the first and/or second interface materials are any first and/or second interface material according to the invention.

In one embodiment of the present invention, the first phase composition, the second phase composition or both may include, inter alia, any composition suitable for building a three-dimensional object according to the invention. In another embodiment, the first phase composition, the second phase composition or both may include, inter alia, any composition suitable for support in building a three-dimensional object according to the invention.

In one embodiment of the present invention, at least one phase of the pseudo composite material may be a continuous phase. In another embodiment, at least one phase may be a non-continuous phase.

In one embodiment of the present invention, the properties of the pseudo composite material may be, inter alia, isotropic properties, un-isotropic properties or a combination thereof. In another embodiment, the properties may be, inter alia, mechanical, thermo-mechanical, optical, acoustic, electrical properties or any combination thereof.

In another embodiment, the mechanical strength of the pseudo composite material along one axis of the material may be higher than the mechanical strength of the material along another axis of the material.

In another embodiment, the elasticity of the pseudo composite material along one axis of the material may be higher than the elasticity of the material along another axis of the material.

In another embodiment, the refractive index of the pseudo composite material along one axis of the material may be different than the refractive index of the material along another axis of the material. In another embodiment, the refractive index of the material along one axis may vary.

In one embodiment of the present invention, each layer consists of only one component or composition. In another embodiment, different components or compositions are used to build other layers.

In one embodiment of the present invention, different types of components (one, two or more) are selectively dispensed to form a layer of the combined components.

In one embodiment of the present invention, each layer consists of a different combination of components or compositions.

In one embodiment of the present invention, at least one or more of the thus deposited layer may include a photopolymer. In another embodiment, the deposited layer may be exposed to radiation energy, for example UV, Vis (visible range), Infra-Red (IR) or Electron Beam (EB), sufficient for at least partial layer solidification or "gelation" of the layer. In one embodiment of the present invention, the radiation exposure may be performed during the deposition process. In another embodiment, the radiation exposure may be performed immediately upon deposition. In one embodiment of the present invention, the radiation exposure may be performed at a controlled temperature. In another embodiment, the temperature may be higher than room temperature.

In one embodiment of the present invention, further layers, comprising similar material types, arrangements and/or combinations, or different types, arrangements and/or combinations of materials to those dispensed previously, are selectively deposited one on top of another, on a layer by layer basis.

The methods according to embodiments of the present invention may further include a controlled temperature step, regardless of materials used, combinations of materials used and/or the type of curing employed.

In one embodiment of the present invention, when at least one of the materials thus dispensed is a photopolymer, a curing step at controlled temperature, may be performed between layer-to-layer depositions, in an almost continuous way, exposing the photopolymer-comprising layers to radiation, partially filtered by the upper, subsequently dispensed layers.

In one embodiment of the present invention, the process of layer by layer deposition and curing at controlled temperature may be performed several times to form a bulk material or a complete three-dimensional object, or alternatively a bulk material, having special pre-designed isotropic or un-isotropic structure and properties.

By use of the controlled temperature in the curing process, the pseudo composite materials thus produced have reach attain optimal thermo-mechanical properties as well as mechanical stress release.

In one embodiment of the present invention, controlled cooling or "tempering" at the end of the printing process may be performed. In another embodiment, the controlled cooling may enable production of a product with special optimized properties.

In one embodiment of the present invention, printing at certain temperature levels may enable the development of special thermal qualities of resistance and durability. For example, printing at a temperature higher than the cured material Tg (using amorphic materials) permits, maximal and/or optimal properties in the final product are achieved.

In one embodiment of the present invention, the process of deposition and curing at controlled temperature may be performed several times in order to form cured bulk pseudo composite materials for use in different applications, such as full three-dimensional bodies of cured photopolymer with specially designed un-isotropic properties and an optimal combination of thermal, mechanical, optical, acoustic and/or other properties.

In one embodiment of the present invention, the PCM may be produced by methods including design of the make-up of the PCM, selection of one or more different photopolymer preparations, selective dispensing of the material in a manner that forms a photopolymer layer, curing of the photopolymer layer by exposure to radiation energy or any combination thereof. In another embodiment, the exposure is sufficient for at least partial solidification of the layer. In another embodiment, the exposure is sufficient for at least partial gelation of the layer. In another embodiment, the radiation energy may be ultraviolet, Infra-red, Vis, electron-beam or any combination thereof. In another embodiment, the radiation exposure is performed during deposition of the material. In another embodiment, the radiation exposure is performed immediately following deposition. In another embodiment, the radiation exposure is performed at a controlled temperature. In another embodiment, the radiation exposure is performed at a temperature above room temperature. In one embodiment of the present invention, subsequent depositions of composite photopolymer materials may be of the same photopolymer type/s or arrangement or may be completely different to the previous types and/or arrangement. In one embodiment of the present invention, curing is performed between deposition of layers, at a controlled temperature, but almost continuously exposing the layers to radiation, partially filtered by the upper layers. In one embodiment of the present invention, by use of controlled temperature in the curing process, the PCM thus produced have optimal thermo-mechanical properties as well as mechanical stress release.

In one embodiment of the present invention, controlled cooling or "tempering" at the end of the printing process enables production of an object with special, optimal properties. In another embodiment, printing at certain temperature levels enables the development of special thermal qualities of resistance and durability. For example, printing higher than the Tg temperature (using amorphic materials) furthers molecular reactivity to obtain different, maximal and/or optimal properties in the final product.

In one embodiment of the present invention, the process of deposition and curing at controlled temperature may be performed several times in order to form cured bulk PCM, for use in different applications. Non limiting examples for applications of PCM are full three-dimensional bodies of cured photopolymer with specially designed un-isotropic properties and an optimal combination of thermal, mechanical, optical, acoustic and/or other properties. In another embodiment, one use of such material may be for filling the thin spaces between segments of a non-continuous layer deposited as described above, however this is only one small example of its use, the potential of PCMs having far-reaching consequences in optimization of the properties of the final printed object.

One embodiment of the present invention provides a method for producing bulk PCM. Another embodiment of the present invention provides a method for producing a complete three-dimensional object. In another embodiment, the method may also enables, for example, the production of complete three-dimensional objects with reduced curl distortion.

In one embodiment, the present invention provides layer upon layer selective deposition of multiple, different materials and/or material compositions. In one embodiment of the present invention, the selective deposition process is performed at controlled temperatures. In one embodiment of the present invention, the multiple materials may be deposited in pre-designed arrangements and/or combinations, enabling the production of a PCM with pre-designed structure and pre-designed properties, which may be different from the properties of each of the individual materials first employed.

In one embodiment, of the present invention the PCM may be prepared using one or more of any of the methods according to the invention. In another embodiment of the present invention, a three dimensional object including, inter alia. a PCM may be prepared using one or more of any of the methods according to the invention.

It will be appreciated by persons skilled in the art that the present invention is not limited by what has been particularly shown and described herein above and that numerous modifications, all of which fall within the scope of the present invention, exist. Rather, the scope of the invention is defined by the claims which follow:

The invention claimed is:

1. A method for the preparation of a composite material by a three-dimensional ink-jet printer, the method comprising:
   designing the composite material to include at least two phases, each phase including a predetermined combination of two or more different liquid compositions, wherein the liquid compositions are two-component type reaction compositions; and
   selectively dispensing, in construction layers, onto a printing tray, each of the liquid compositions from a different ink-jet printing head to form the at least two phases of the composite material, the composite material having predesigned properties,
   wherein said compositions polymerize or cure via a two-component type chemistry reaction.

2. The method according to claim 1, wherein each phase is comprised of a different combination of two-component type reaction compositions.

3. The method according to claim 1, wherein at least one phase is comprised of a single two-component type reaction composition.

4. The method according to claim 1, wherein at least one phase is comprised of two or more two-component type reaction compositions.

5. The method according to claim 1, wherein the compositions are dispensed sequentially.

6. The method according to claim 1, wherein each of the construction layers is made of predetermined combinations of at least two different compositions.

7. The method according to claim 2, wherein the different combinations are determined according to desired properties of the composite material being prepared.

8. The method according to claim 7, wherein said desired properties are selected from the group comprising high tensile strength, high impact resistance and high heat deflection temperature.

9. The method according to claim 7, wherein said desired properties comprise mechanical, thermo-mechanical, optical, acoustic, electrical properties or any combination thereof.

* * * * *